US006631182B1

(12) United States Patent
Schwab et al.

(10) Patent No.: US 6,631,182 B1
(45) Date of Patent: Oct. 7, 2003

(54) CALL SCREENING APPARATUS AND METHOD

(75) Inventors: Eileen Cecilia Schwab, Schaumburg, IL (US); Gayle Roberta Ekstrom, Chicago, IL (US); Gisele A Marcus, Chicago, IL (US); Edward Alan Ossello, Chicago Heights, IL (US)

(73) Assignee: Ameritech Corporation, Hoffman Estates, IL (US)

( * ) Notice: Subject to any disclaimer, the term of this patent is extended or adjusted under 35 U.S.C. 154(b) by 0 days.

(21) Appl. No.: 09/124,960

(22) Filed: Jul. 29, 1998

(51) Int. Cl.[7] .......................... H04M 1/64; H04M 3/42; H04M 1/56

(52) U.S. Cl. .................. 379/88.19; 379/88.11; 379/88.12; 379/88.2; 379/201.01; 379/201.02; 379/201.07; 379/201.08; 379/142.08

(58) Field of Search ...................... 379/67.1, 70, 88.01, 379/88.19, 88.2, 93.03, 93.09, 93.23, 93.35, 201, 212, 88.12–88.17, 88.21–88.26, 130, 140, 142, 199, 210, 221, 215, 93.24, 908, 201.01, 201.02, 201.07, 201.08, 207.2, 207.12, 142.01, 142.06, 142.08; 455/31.2, 445; 348/14

(56) References Cited

U.S. PATENT DOCUMENTS

| | | | | |
|---|---|---|---|---|
| 4,942,598 A | | 7/1990 | Davis | 455/31.2 |
| 5,003,575 A | | 3/1991 | Chamberlin et al. | 379/88.26 |
| 5,007,076 A | * | 4/1991 | Blakely | 379/88.21 |
| 5,017,917 A | | 5/1991 | Fisher et al. | 340/825.79 |
| 5,029,196 A | | 7/1991 | Morganstein | 379/88.23 |
| 5,327,486 A | * | 7/1994 | Wolff et al. | 379/93.23 |
| 5,329,578 A | | 7/1994 | Brennan et al. | 379/88.19 |
| 5,394,445 A | * | 2/1995 | Ball et al. | 379/88.21 |
| 5,408,528 A | | 4/1995 | Carlson et al. | 379/211 |
| 5,422,936 A | | 6/1995 | Atwell | 379/88.23 |
| 5,471,519 A | * | 11/1995 | Howe et al. | 379/67.1 |
| 5,487,111 A | | 1/1996 | Slusky | 379/211 |
| 5,553,128 A | | 9/1996 | Grimes | 379/211 |
| 5,570,410 A | | 10/1996 | Hooshiari | 379/32 |
| 5,583,564 A | | 12/1996 | Rao et al. | 348/14 |
| 5,583,920 A | * | 12/1996 | Wheeler, Jr. | 379/88 |
| 5,588,037 A | | 12/1996 | Fuller et al. | 455/31.2 |
| 5,644,629 A | * | 7/1997 | Chow | 379/142 |
| 5,651,053 A | * | 7/1997 | Mitchell | 379/67 |
| 5,652,789 A | * | 7/1997 | Miner et al. | 379/201 |
| 5,675,507 A | * | 10/1997 | Bobo, II | 364/514 R |
| 5,742,905 A | * | 4/1998 | Pepe et al. | 455/461 |
| 5,752,191 A | * | 5/1998 | Fuller et al. | 455/445 |
| 5,757,899 A | * | 5/1998 | Boulware et al. | 379/196 |
| 5,946,386 A | * | 8/1999 | Rogers et al. | 379/265 |

* cited by examiner

*Primary Examiner*—Allan Hoosain
(74) *Attorney, Agent, or Firm*—Brinks Hofer Gilson & Lione

(57) ABSTRACT

A method of screening incoming telephone calls and programming screening options and apparatus that allows incoming calls to be screened according to various criteria programmed by a subscriber.

6 Claims, 24 Drawing Sheets

CALL SCREENING APPARATUS AND METHOD

FIELD OF THE INVENTION

The present invention relates to a call screening apparatus and method, and, more particularly, to a call screening apparatus and method that allows subscribers to program a subscribers' profile indicating desired screening options to route incoming calls based upon the subscribers' programmed profile.

BACKGROUND OF THE INVENTION

Voice mail systems are well known and offer the convenience of providing a message platform where a caller can leave a message for the called party who can then retrieve the message and return the call at his or her convenience. An example of the operation of a typical voice mail system involves a caller trying to reach a called party who is on the phone. Typically, the caller has the option of having the call directed to the called party's voice mail or reaching another party by depressing a key on the caller's keypad. The caller does not have the option of letting the called party know who is calling so that the called party can decide whether to accept the call instead of letting the call be directed to voice mail or someone else. The called party is not notified that a call has been placed until the calling party leaves a message and an indicator lets the called party know that a message has been left in voice mail. Alternatively the called party may be notified that another call is waiting on the line but the called party has no indication of the identity of the caller I.D. or call waiting.

Some voice mail systems allow the call to be screened based upon the recording of a calling party's name. More particularly, the system prompts the calling party to verbally input his or her name which is recorded by the system. The call is then completed to the called party by announcing the recorded name or identity of the calling party. On being apprised of the identity of the calling party, the called party can dispose of the call in one of various manners, including rejecting the call. Other systems also provide for screening incoming calls based upon the calling party's number. The calling party's number is displayed to a subscriber typically on a LCD screen and the subscriber can decide whether to answer the incoming call or not.

It is desirable to provide a call screening apparatus and method that allows incoming calls to be screened according to various criteria programmed by a subscriber. It is also desirable to provide a call screening apparatus and method that allows the subscriber the option of determining the calling party's identity before answering the incoming call. It is furthermore desirable to provide a call screening apparatus and method that is flexible and can be easily modified by the subscriber.

SUMMARY OF THE INVENTION

According to a first aspect of the invention there is provided a method of screening incoming telephone calls, the method comprising the steps of:

(a) coupling an incoming call directed to a subscriber to a platform;
(b) determined if a screening feature is active;
(c) in response to step (b), determining if the incoming call is on the subscriber's screening list stored on the platform;
(d) in response to step (c), sending the call to a default destination if it is determined that the incoming call is on the subscriber's screening list;
(e) in response to step (b), determining if the subscriber has selected a calling party recorded name screening if the screening feature is not active;
(f) in response to step (e), if it is determined that the subscriber has selected the calling party recorded name screening, prompting the calling party to state his or her name and recording the same;
(g) if it is determined in step (e) that the subscriber has not selected the calling party recorded name screening, determining if the subscriber has selected a calling party number screening;
(h) in response to step (f), initiating a call from the platform to the subscriber and playing back the recording of step (f) to the subscriber; and
(i) in response to step (g), if it is determined that the subscriber has selected the calling party number screening, initiating a call from the platform to the subscriber and stating the calling party's number to the subscriber.

According to a second aspect of the invention there is provided a method for screening incoming telephone calls, the method comprising the steps of:

(a) coupling a call directed to a first telephone station to a service node, said call being initiated by a caller at a second telephone station;
(b) retrieving a subscriber's profile associated with the first telephone station at the service node in response to step (a) wherein the subscriber's profile indicates which screening options have been selected by the subscriber;
(c) screening the call of step (a) in accordance with the subscriber's profile by:
  (i) determining if the call from the second telephone station is on a screening list established by the subscriber;
  (ii) in response to step (i) sending the call to a default destination if it is determined that the second telephone station is on the screening list;
  (iii) determining if the subscriber has selected a calling party recorded name screening;
  (iv) in response to step (iii), if it is determined that the subscriber has selected the calling party recorded name screening, prompting the calling party to state his or her name and recording the same;
  (v) if it is determined in step (iii) that the subscriber has selected the calling party recorded name screening, determining if the subscriber has selected a calling party number screening;
  (vi) in response to step (iv), if it is determined that the subscriber has selected the calling party number screening, initiating a call from the platform to the subscriber and indicating the calling party's number to the subscriber; and
  (vii) in response to step (v), if it is determined that the subscriber has selected the calling party number screening, initiating a call from the platform to the subscriber and indicating the calling party's number to the subscriber.

According to a third aspect of the invention there is provided a method of programming call screening options, the method comprising the steps of:

(a) coupling an incoming call from a subscriber to a service node;
(b) generating a series of queries to the subscriber in response to the incoming call of step (a) wherein the series of queries includes:

(i) whether a screening list should be created and if so what telephone numbers should be included on the screening list;

(ii) whether a calling party number screening option should be activated so that the calling number is provided to the subscriber;

(iii) whether a recorded calling party name screening option should be activated so that the calling party is prompted to record his or her name which is then played back to the subscriber; and (c) generating a subscriber profile in response to the subscriber's responses to the series of queries generated in step (b).

According to a fourth aspect of the invention there is provided a method of programming call screening options, the method comprising the steps of:

(a) coupling an incoming call from a subscriber to a service node;

(b) presenting the subscriber with directions for selecting one or more screening options comprising the directions of:

(i) depress key 1 of the telephone for caller name screening;

(ii) depress key 2 of the telephone for calling party number screening; and (iii) depress key 4 of the telephone for modification of the subscriber's screening list; and (c) detecting which key is depressed in step (b).

According to a fifth aspect of the invention there is provided a call screening apparatus for screening incoming telephone calls, the apparatus comprising:

a memory for storing a profile for each subscriber wherein each profile indicates the screening options selected by the subscriber associated with the profile;

a platform for receiving an incoming telephone call from a calling party;

a processor located on the platform programmed to screen incoming telephone calls according to the following steps:

(a) determining if a screening feature is active;

(b) in response to step (a), determining if the incoming call is on the subscriber's screening list stored on the platform;

(c) in response to step (b), transferring the call to the subscriber's default destination if it is determined that the incoming call is on the subscriber's screening list;

(d) in response to step (a), determining if the subscriber has selected a calling party recorded name screening;

(e) in response to step (d), if it is determined that the subscriber has selected the calling party recorded name screening, prompting the calling party to state his or her name and recording the same;

(f) determining if the subscriber has selected a calling party number screening;

(g) in response to step (e), initiating a call from the platform to the subscriber and playing back the recording of step (e) to the subscriber; and (h) in response to step (f), if it is determined that the subscriber has selected the calling party number screening, initiating a call from the platform to the subscriber and presenting the calling party's number to the subscriber.

According to a sixth aspect of the invention there is provided an apparatus for programming call screening options, the apparatus comprising:

a platform for receiving an incoming call from a subscriber a processor located on the platform programmed to generate the following queries:

(i) whether a screening list should be created and if so what telephone numbers should be included on the screening list;

(ii) whether a calling party number screening option should be activated so that the calling party is provided to the subscriber;

(iii) whether a recorded calling party name screening option should be activated so that the calling party is prompted to record his or her name which is then played back to the subscriber; and generating a subscriber profile in response to the subscriber's responses to the series of queries generated in steps (i–iii);

a database storing a subscriber profile generated in response to the subscriber's responses to the set of inquiries.

DETAILED DESCRIPTION OF THE PRESENTLY PREFERRED EMBODIMENTS

Figure 1:
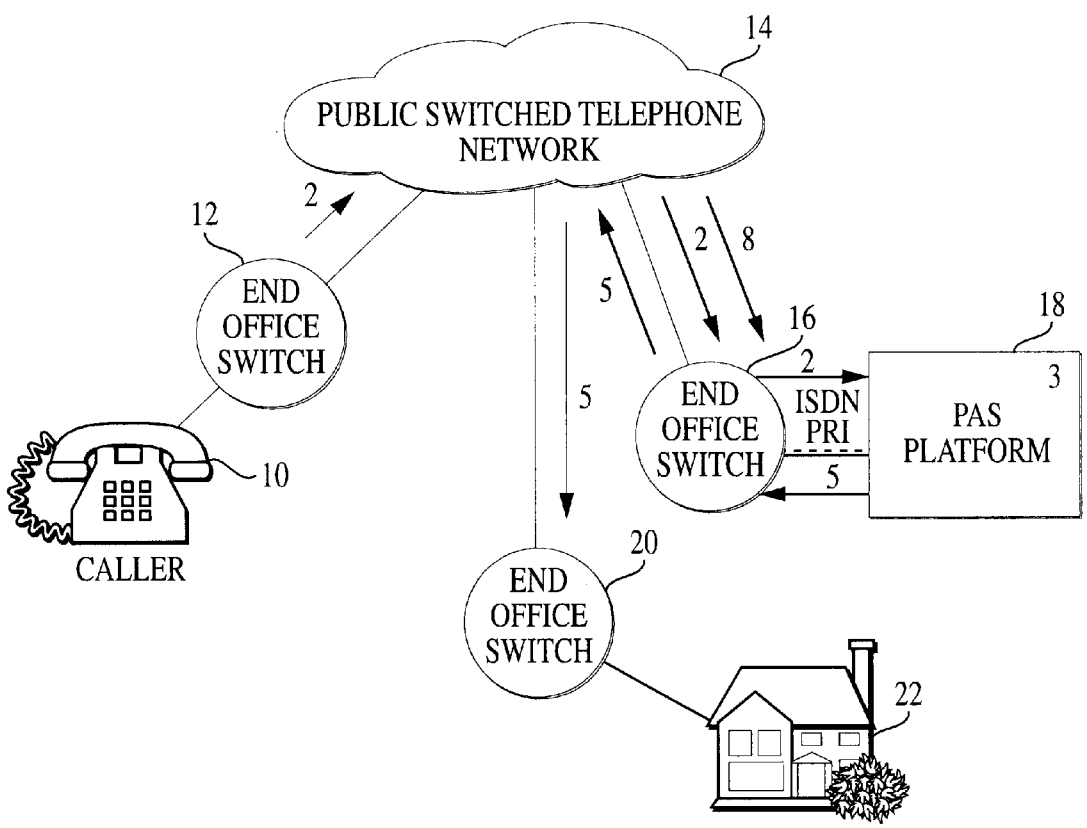
FIG. 1 is a block diagram illustrating the interfacing equipment for a call screening apparatus and method according to a preferred embodiment of the present invention.

FIG. 1 is a block diagram illustrating the interfacing equipment for a call screening apparatus and method according to a preferred embodiment of the present invention. Shown in FIG. 1 is a caller 10, a first end office switch 12, a public switched telephone network 14, a second end office switch 16, a call screening platform 18, a third end office switch 20, and a subscriber 22. For simplicity purposes, only one caller and one subscriber have been illustrated. It will of course be understood that the present invention would support a plurality of callers and subscribers, as well as a plurality of end office switches connecting the callers and subscribers to the public switched telephone network 14. In a preferred embodiment, the call screening apparatus and method according to a preferred embodiment is implemented on a subscriber basis. The subscriber receives a subscriber telephone number or personal access service (PAS) telephone number upon subscription.

The call screening platform 18 which will be described in detail with reference to FIG. 2, implements the features of voice mail and call screening according to the present invention. The call screening platform 18 has a database that contains a profile for each subscriber indicating what screening options the subscriber has selected as well as any modifications to that profile. In a preferred embodiment of the present invention each subscriber can choose from a plurality of screening options including: a screening list containing a list of telephone numbers which may be added to or deleted from and which will be automatically screened by the platform 18 without a call being placed to the called party; recorded caller name screening and calling party number screening both of which involve placing a call to the called party from the platform. The subscriber also has the option of disabling any one or all of the screening options. The screening list feature allows the subscriber to designate which telephone numbers they do wish to accept calls from. When a call is received from a telephone number on the screening list it will be processed according to preprogrammed instructions as will be described hereinafter. The recorded caller name screening feature asks the caller to state his or her name so that it can be recorded. The recording is played back to the subscriber who can then decide whether to accept the call or dispose of it in some other manner. The calling party number screening option allows the calling party's number to be spoken to the subscriber who can then decide whether to accept the call or have it routed to a default destination such as voice mail, for example.

An example of screening based upon the recorded caller name screening feature will now be given with reference to FIG. 1. The caller 10 dials the subscriber's telephone number. The call is routed from the first end switch 12 through the network 14 to the platform 18. The subscriber's profile stored on the platform 18 indicates that incoming calls should be directed to the subscriber's home. If the recorded caller name screening feature is activated, the platform 18 prompts the caller to speak his or her name so that it can be recorded. The platform 18 via the end office switch 20 initiates a call to the subscriber's home. When the call is answered, the platform 18 plays back to the subscriber the recorded caller name. The subscriber has the option of either accepting the call or disposing of it in some preprogrammed manner such as routing the call to the subscriber's voice mailbox, for example.

Figure 2:
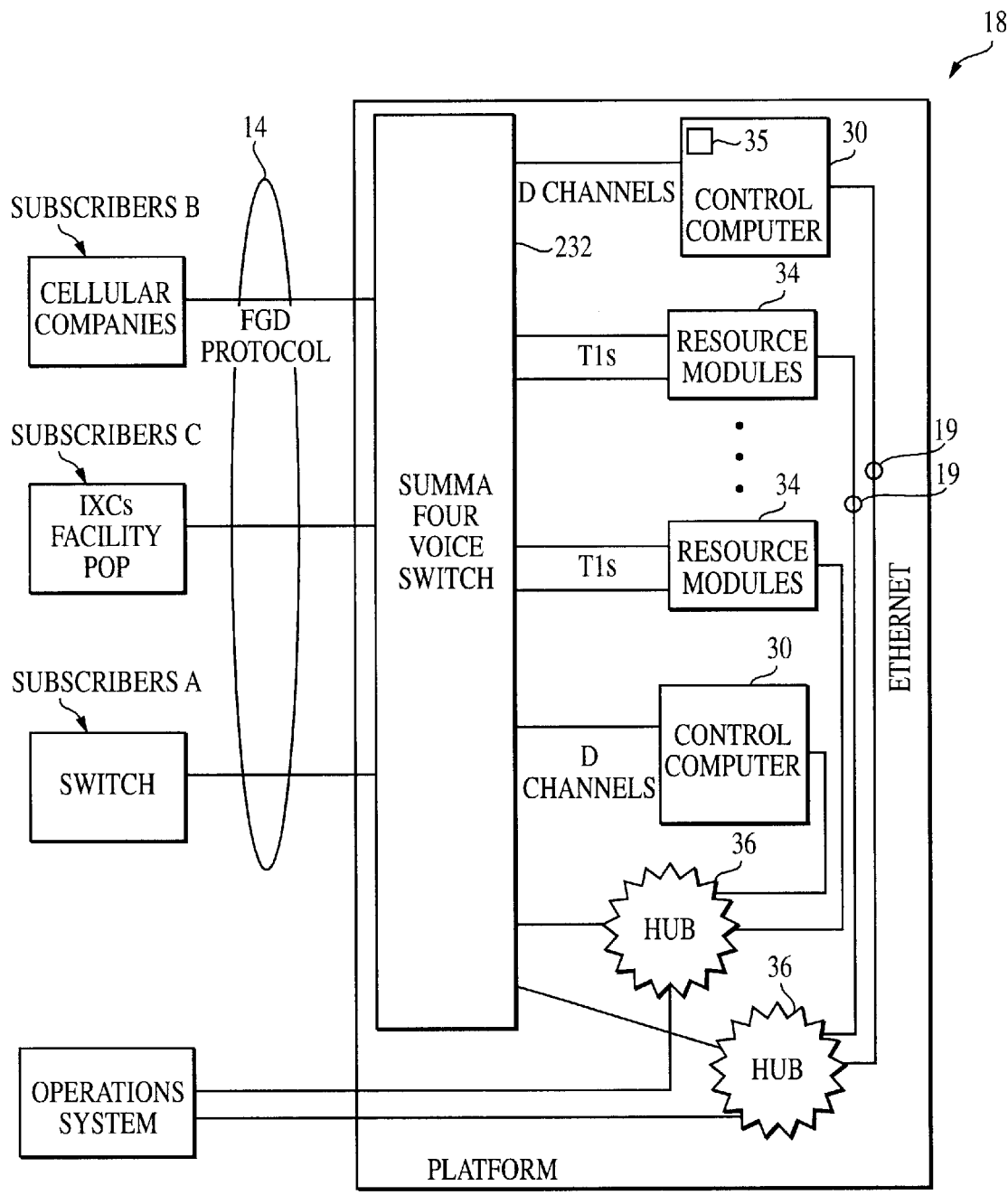
FIG. 2 is a block diagram of the platform shown in FIG. 1.

FIG. 2 is a block diagram of the call screening platform 18 shown in FIG. 1. The platform 18 is preferably implemented in a standalone service node which can be integrated into an existing network infrastructure. The service supports the platform applications and provides service functionality to a plurality of subscribers. The platform includes several hardware and software components that are integrated into the platform to provide the processing, switching, peripheral control, database of subscribers' profiles and interactive voice response capabilities for implementing the present invention. Specifically, these components include computers 30, a voice switch 32, and multiple resource modules 34 for interactive voice response, voice mail, and voice recognition, all connected within the platform 18 preferably by a dual Ethernet bus 19 connected through a pair of hubs 36. Preferably voice switch 32 is a Summa Four voice switch available from Summa Four, Inc. of Manchester, N.H. Of course other switches may be used and the present invention is not limited to the illustrated embodiment.

In a preferred embodiment the platform 18 has two types of connections to the public switched telephone network 14 to terminate incoming calls to subscriber telephone numbers stored on the platform, and originate outgoing calls to the subscribers location or voice mail box. These are standard telephone connections which have the ability to pass out of band information as determined by the FCC such as PRI, BRI, for example. Subscribers A may have their calls directed to the platform 18 over PRI lines that connect the platform 18 to end office switches. The PRIs connect through a smart jack (not shown), for example, to DS1 interface ports (not shown) of the Summa Four switch 32 in the platform 18. Subscribers B, for example, cellular/paging users, may have their calls directed to the platform 18 either over PRI lines that connect the platform 18 to end office switches or they may have their calls carried by DS1 special access facilities with FGD protocol that connect the platform to a cellular company's switch. The PRIs and the special access facilities both connect through a smart jack (not shown), for example, to the DS1 interface ports (not shown) of the Summa Four switch in the platform 18. Subscribers C who are served by Interexchange Carriers (IXCs) may have their calls carried by DS1 special access facilities with FGD protocol that connect the platform 18 to the IXC's facility point of presence, (POP). The special access facilities connect through a smart jack (not shown), for example, to the DS1 interface ports (not shown) of the Summa Four switch in the platform 18.

Preferably, the end office switch or switches that directly connect to the platform 18 terminate ISDN PRI lines, however, this is not necessary to practice the invention. These end office switches provide line-side connections to the platform 18 as they would to any other customer premises equipment, thus they contain the subscriber telephone numbers. In a preferred embodiment, a switch such as Northern Telecom DMS-100 can be used for the end office switches. While the present invention is described with reference to the illustrated platform shown in FIG. 2, the present invention is not limited to such an architecture.

The subscriber can create his or her own subscriber profile by programming and modifying an existing profile directly from a DTMF telephone set. In particular, a subscriber can select and later modify which screening features should be implemented from any location by dialing his or her PAS telephone number. FIGS. 3–14 are flowcharts representing the steps taken by the subscriber to implement screening features. FIGS. 15–24 are flowcharts of incoming call processing which will be described in greater detail hereinafter.

I. Voice Mail Screening Implementation and Modification By the Subscriber

Figure 3:
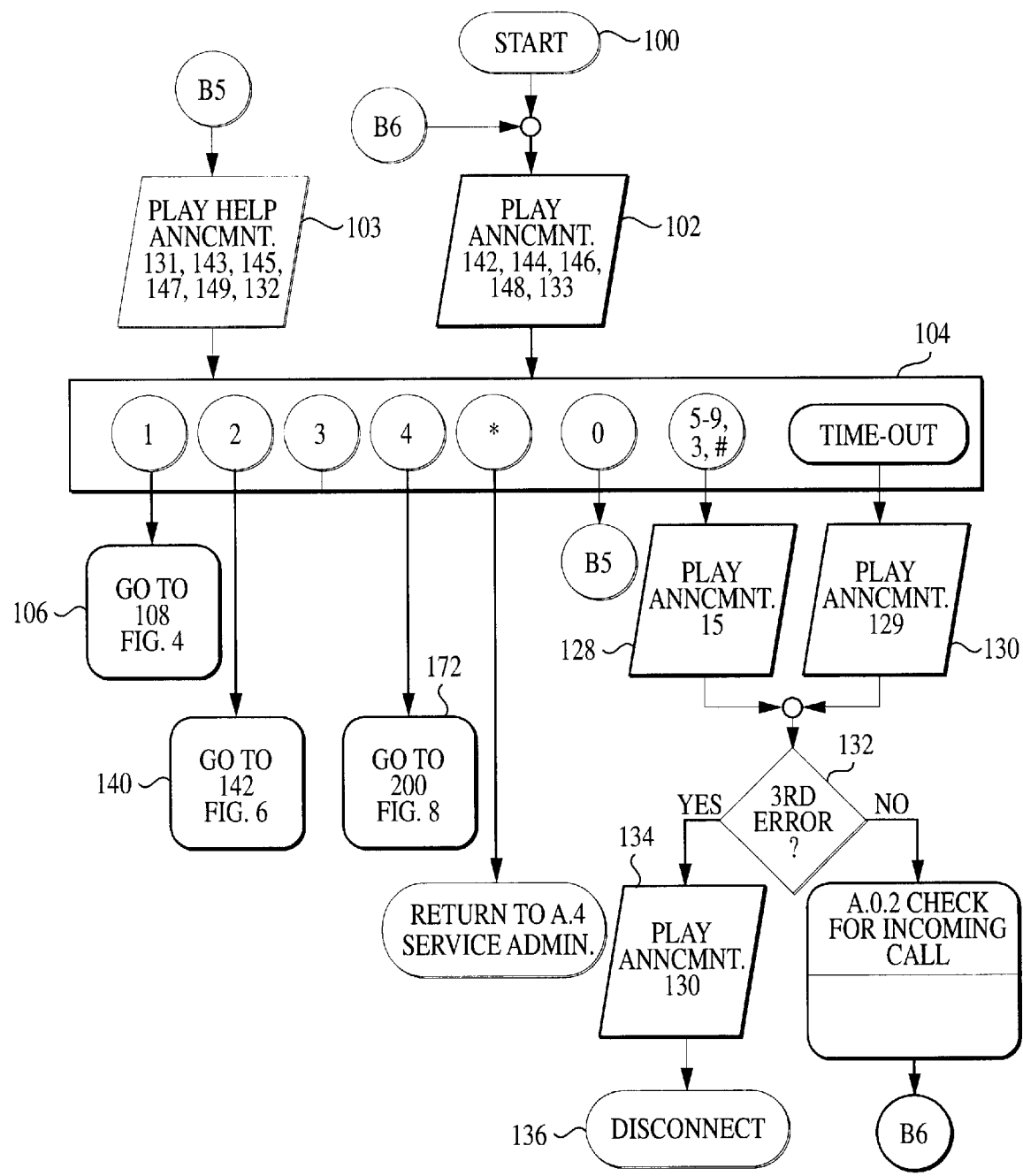
FIG. 3 is a flowchart of the overall screening setup program according to a preferred embodiment of the present invention.

FIG. 3 is a flowchart of the overall screening set-up and modification program. This flowchart represents the instructions or steps followed by the control computers 30 of the platform 18. The starting point for the screening program is shown at reference 100 where a subscriber's call to the platform 18 is answered. The subscriber is asked to enter a password in order to enter a main menu. At step 102, several announcements are played that instruct the subscriber how to select screening options. In particular the following series of announcements are played:

"Screening Menu. For recorded caller name screening, press one. For calling party number screening, press two . . . . To modify your screening list, press four. To return to the main menu, press star. For help, press zero now."

At step 104 it is determined how the subscriber responded to the announcement, i.e., what key on the keypad was depressed. Depending upon the selection various subroutines will be entered. For example, if key 1 is depressed, then at step 106 the recorded caller name screening subroutine program is entered.

A. Recorded Caller Name Screening Subroutine

Figure 4:
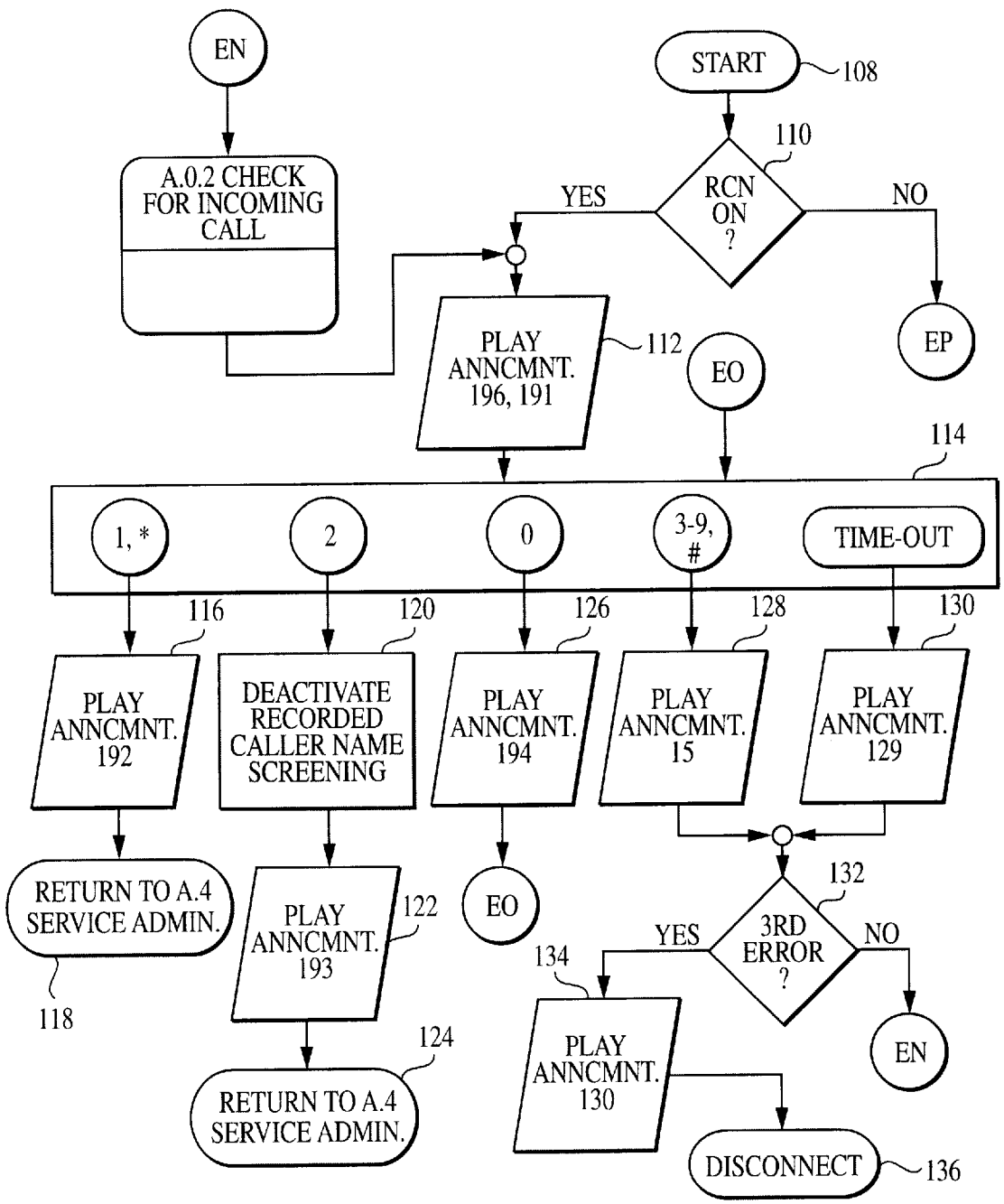
FIGS. 4–5 are flowcharts of the recorded caller name screening subroutine program.
Figure 5:
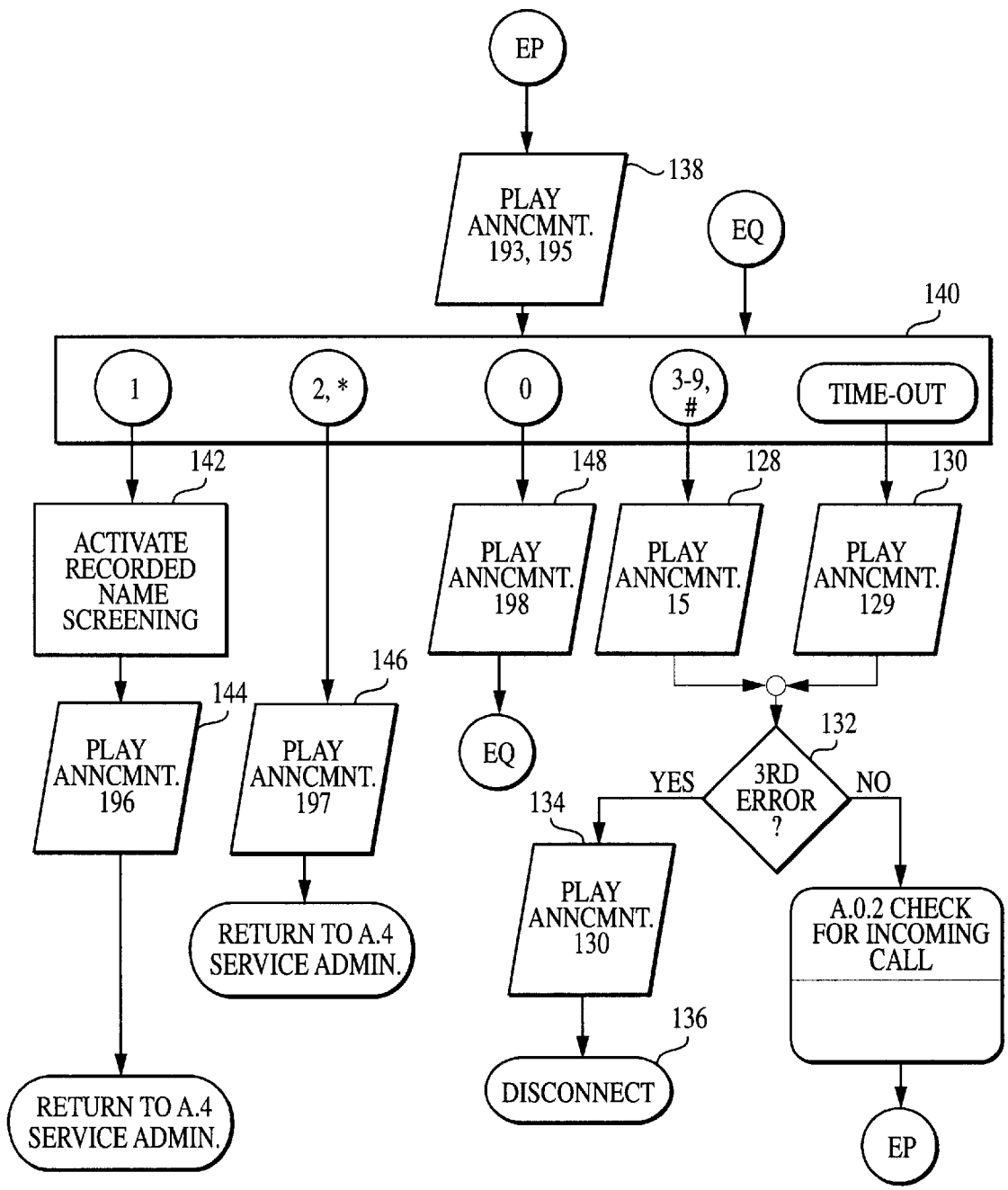

FIGS. 4–5 are flowcharts of the recorded caller name screening subroutine program. The starting point for this program is at reference 108. At step 110 it is determined if the recorded caller name screening feature is activated. If it is, then at step 112 the following series of announcements are played to the subscriber:

"Recorded caller name screening is activated. To leave recorded caller name screening activated, press one. To turn it off, press two. (1 second pause) For help, press zero now."

At step 114 it is determined what key is depressed. If key 1 or the star key is depressed, then at step 116 the following announcement is played: "Recorded caller name screening left activated." At step 118 control is returned to a main (administration) menu which does not form part of the present invention.

If key 2 is depressed then at step 120 the recorded caller name screening feature is deactivated and at step 122 the following announcement is played: "Recorded caller name screening turned off." At step 124 control is returned to the main menu.

If the zero key is depressed, then at step 126 the following announcement is played:

"Help information. You can make your selection while this message is playing. Pressing one will leave recorded name screening activated and return you to the main menu. Pressing two will turn off recorded caller name screening. If you need additional help, please contact your account representative."

Control is then returned to step 114 to determine what key is depressed. If either key 3–9 or the pound sign is depressed, then at step 128 the following announcement is played: "<key pressed> is not a valid menu selection." <> indicates the key depressed and is announced.

If no key has been depressed within a predetermined time period, preferably about six seconds, then the system times-out and at step 130 the following announcement is played: "No keypresses have been received."

At step 132 it is determined whether it is the third time that the user has either not depressed a key before the system timed-out or if an invalid key has been depressed. Of course the number of times this occurs is arbitrary and it may be more or less than three times. The same is true throughout this disclosure wherever a number is specified. If it has been the third time, then at step 134 the following message is played:

"You are having trouble using your service. Please contact an account representative. Thank you. Good-bye."

The caller is disconnected at step 136. If it has not been the third time that an invalid key has been depressed or that the system has timed-out before a selection has been made, control is returned to step 112 and the subroutine is repeated.

If it was determined at step 110 that the recorded caller name feature is not activated, then control is passed to step 138 (FIG. 5) where the following announcement is played:

"Recorded caller name screening is turned off. To activate recorded caller name screening, press one. To leave it off, press two. (1 second pause) For help, press zero now."

Then at step 140 it is determined which key is depressed. If key 1 is depressed, then at step 142 the recorded name screening is activated. At step 144 the following announcement is played: "Recorded caller name screening is activated," and control is returned to the main menu.

If the star key or key 2 is depressed, then at step 146 the following announcement is played: "Recorded caller name screening left off," and control is returned to the main menu.

If the zero key is depressed, then at step 148 the following announcement is played:

"Help information. You can make your selection while this message is playing. Pressing one will activate recorded name screening. When this feature is activated, every caller will be asked to say their name and their response will be played back when you are contacted. Pressing two will leave recorded caller name screening off and return you to the main menu. If you need additional help, please contact your account representative."

Control is then returned to step 140 to determine which key is depressed. If either key 3–9 or the pound key is depressed or the system times out before a selection is made, then the same steps 128, 130, 132, 134, 136 as in FIG. 4 are carried out which need not be described again.

Returning to FIG. 3 if key 2 is depressed at step 104, then at step 142 the calling party number screening subroutine program is entered.

B. Calling Party Number Screening Subroutine

Figure 6:
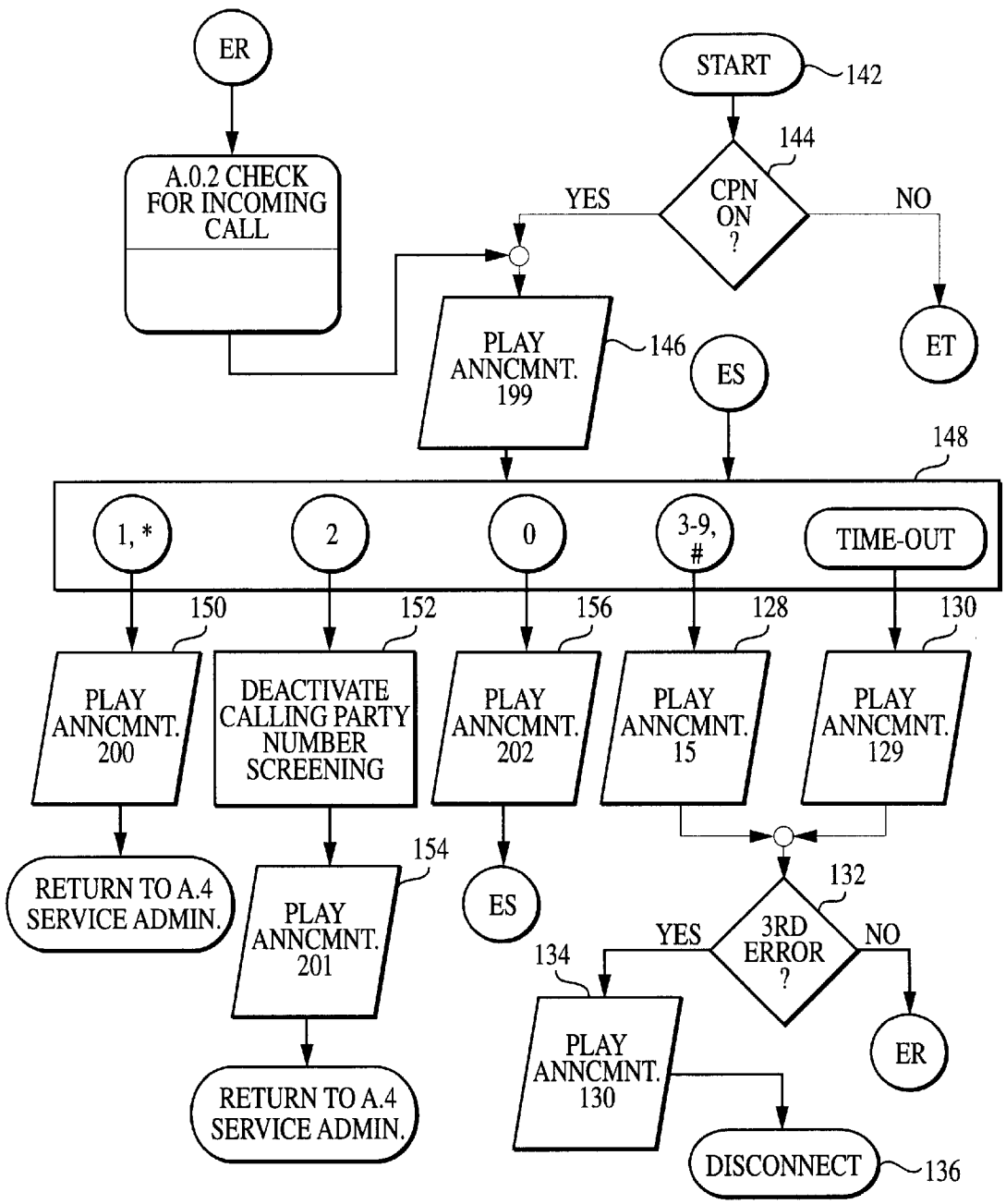
FIGS. 6–7 are flowcharts of the calling party number screening subroutine program.
Figure 7:
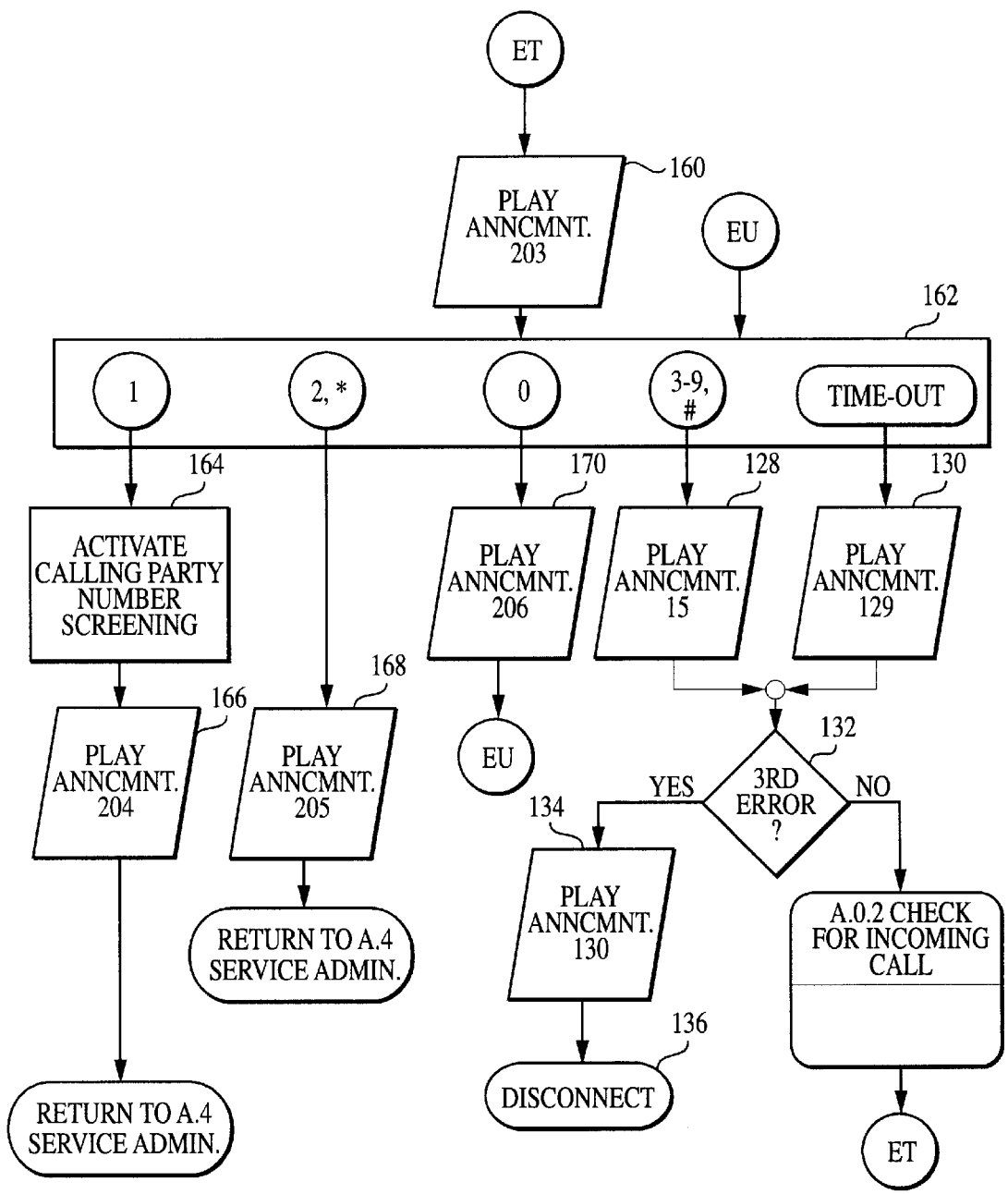

FIGS. 6–7 are flowcharts of the calling party number screening subroutine program. The starting point for this program is at step 142. At step 144 it is determined if the calling party number screening is activated. If it is, then at step 146 the following announcement is played:

"To leave calling party number screening activated, press one. To turn it off, press two. (1 second pause) For help, press zero now."

Then at step 148 it is determined what key is depressed. If key 1 or the asterisk key is depressed, then at step 150 the following message is played: "Calling party number screening left activated," and control is returned to main menu. If key 2 is depressed, then at step 152 the calling party number screening is deactivated and at step 154 the following message is played: "Calling party number screening turned off," and control is returned to the main menu. If the zero key is depressed, then at step 156 the following message is played:

"Help information. You can make your selection while this message is playing. Pressing one will leave calling party number screening activated and return you to the main menu. Pressing two will turn off calling party number screening. If you need additional help, please contact your account representative."

Control is then returned to step 148 to determine what key is depressed. If the caller does not make a selection before the system times out or either key 3–9 or the pound sign is depressed, the same sequence of steps 128, 130, 132, 134, 136 described with reference to FIG. 4 are carried out.

If it is determined at step 144 that the calling party number is not activated, then at step 160 (FIG. 7) the following announcement is made:

"To activate calling party number screening, press one. To leave it off, press two. (1 second pause) For help, press zero now."

At step 162 it is determined what key is depressed. If key 1 is depressed, then at step 164 the calling party number screening is activated and at step 166 the following announcement is made: "Calling party number screening is activated," and control is returned to the main menu. If key 2 is depressed, then at step 168 the following announcement is played: "Calling party number screening left off," and control is returned to the main menu. If the zero key is depressed, then at step 170 the following announcement is played:

"Help information. You can make your selection while this message is playing. Pressing one will activate calling party number screening. When this feature is activated, you will hear the number of the person who is calling if it is available when you are contacted. Pressing two will leave calling party number screening off and return you to the screening menu. If you need additional help, please contact your account representative."

Control is then returned to step 162 to determine what key is depressed. If any other key is depressed or the system times out before a selection is made, the same sequence of steps 128, 130, 132, 134, 136 described with reference to FIG. 4 are carried out.

Returning to FIG. 3, if key 4 is depressed at step 104, then at step 172 the screening list subroutine program is entered.

C. Screening List Subroutine

FIGS. 8–14 are the flowcharts of the screening list subroutine program. The subroutine begins at reference 200. At step 202 it is determined if the screening list is empty. If it is not, then at step 204 it is determined if the screening list is full. If the list is not empty and not full, then at step 206 the following announcement is played:

"To listen to your screening list, press one. To add a number to the list, press two. To delete a number, press three. To return to the main menu, press star. For help, press zero now."

At step 208 it is determined what key is depressed. If key 1 is depressed, then at step 210 the following announcement is-played: "The numbers on your screening list are <screening list>." Control is then returned to step 206. If the star key is depressed, then at step 212 the following announcement is played: "Screening list maintenance complete," and control is returned to the main menu. If the zero key is depressed, then at step 214 the following announcement is played:

"Help information. You can make your selection while this message is playing. Pressing one will read the numbers on your screening list to you. Pressing two will allow you to add a new number to the list. Pressing three will allow you to delete one of the numbers from the list. If you need additional help, please contact your account representative."

Control is then returned to step 208 to determine what key is depressed. If no selection is made and the system times out or if either key 4–9 or the pound key is depressed, the same steps 128, 130, 132, 134, 136 are carried out as described with reference to FIG. 4.

If key 2 is depressed to add a number to the screening list, then at step 216 (FIG. 9) the following announcement is played:

"Please enter the ten digit number to be added to the screening list. If you make a mistake while entering the number, press star. To cancel adding a number, just press star. For help, press zero now."

Figure 8:
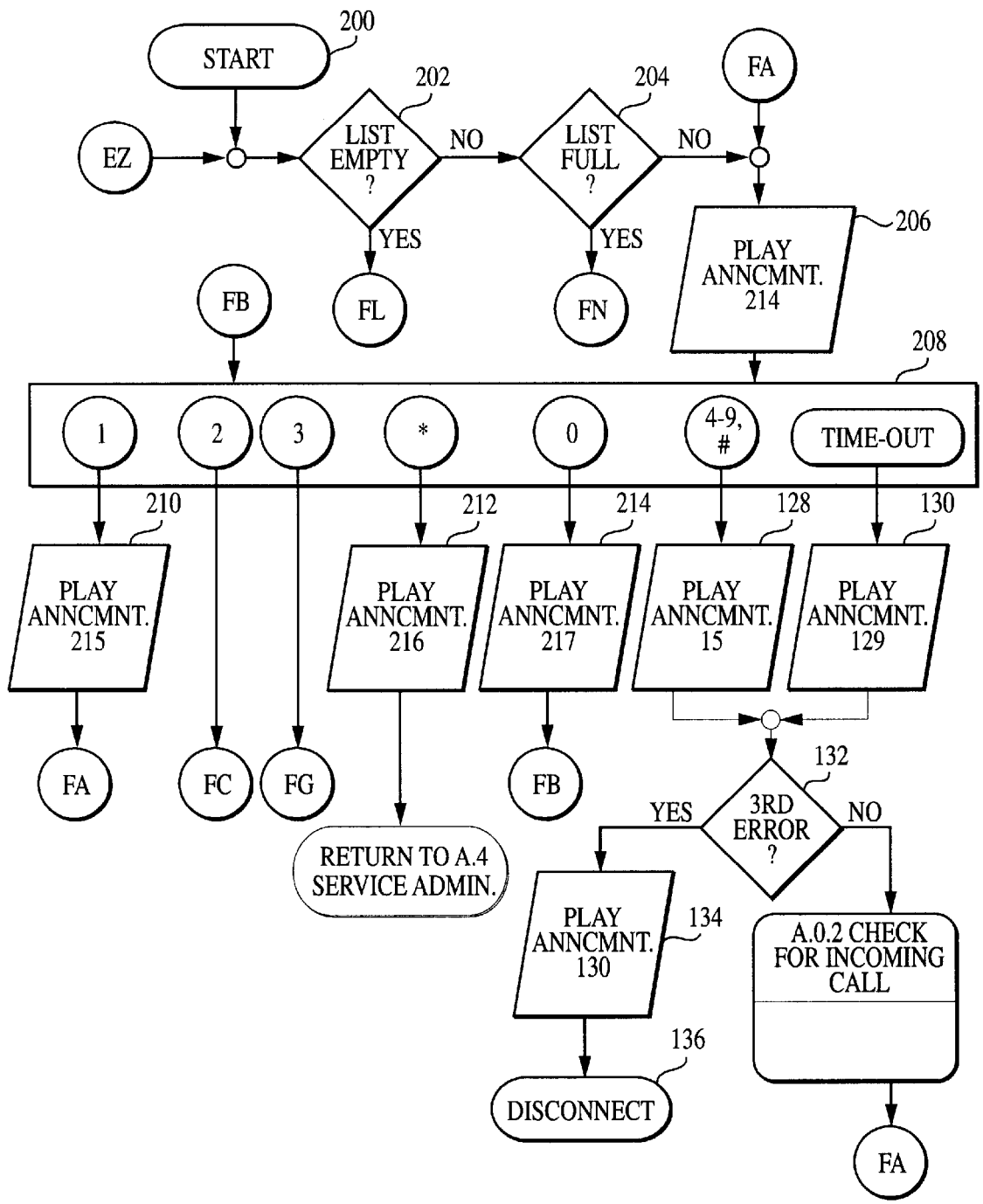
FIGS. 8–14 are flowcharts of the screening list subroutine program.

At step 218 it is determined what keys the subscriber has depressed. If keys 0–9 are depressed, they are stored in a memory until the star key is depressed, then at step 220 it is determined if any digits have been stored in memory. If there was, then at step 222 the following announcement is played: "Entry cleared," and control is returned to step 218 to determine what key is depressed. If not, then at step 224 the following announcement is played: "Screening list addition canceled," and control is returned to step 202 (FIG. 8).

If the pound key is depressed or the system times out, then at step 226 it is determined if the zero key had been depressed once. If it has, then at step 228 the following announcement is played:

"Help information. You can enter the number which you would like to add to the screening list as a ten digit telephone number. It is not necessary to enter a one before the area code. If you make a mistake while entering the number, pressing star will clear what you have entered and let you start over. Pressing star without entering any digits will cancel the addition of a number to the list. If you need additional help, please contact your account representative."

Control is returned to step 218 to determine what key is depressed. If the zero key has not been depressed then at step 230 it is determined if a valid telephone number has been entered. If not, then at step 232 the following announcement is played: "<entered number > is not a valid ten-digit telephone number."

It was determined at step 230 that the phone number is invalid, control is then passed to step 132 where it is determined if it is the third attempt to enter a valid number. If not, control is returned to step 216. If it is the third failed attempt, control is passed to step 134 as described with reference to FIG. 3. If a valid telephone number was entered, then at step 234 (FIG. 10) the following announcement is played:

"<entered number> If this is the number to add to the screening list, press one. To reenter the number, press two. For help, press zero now."

Figure 9:
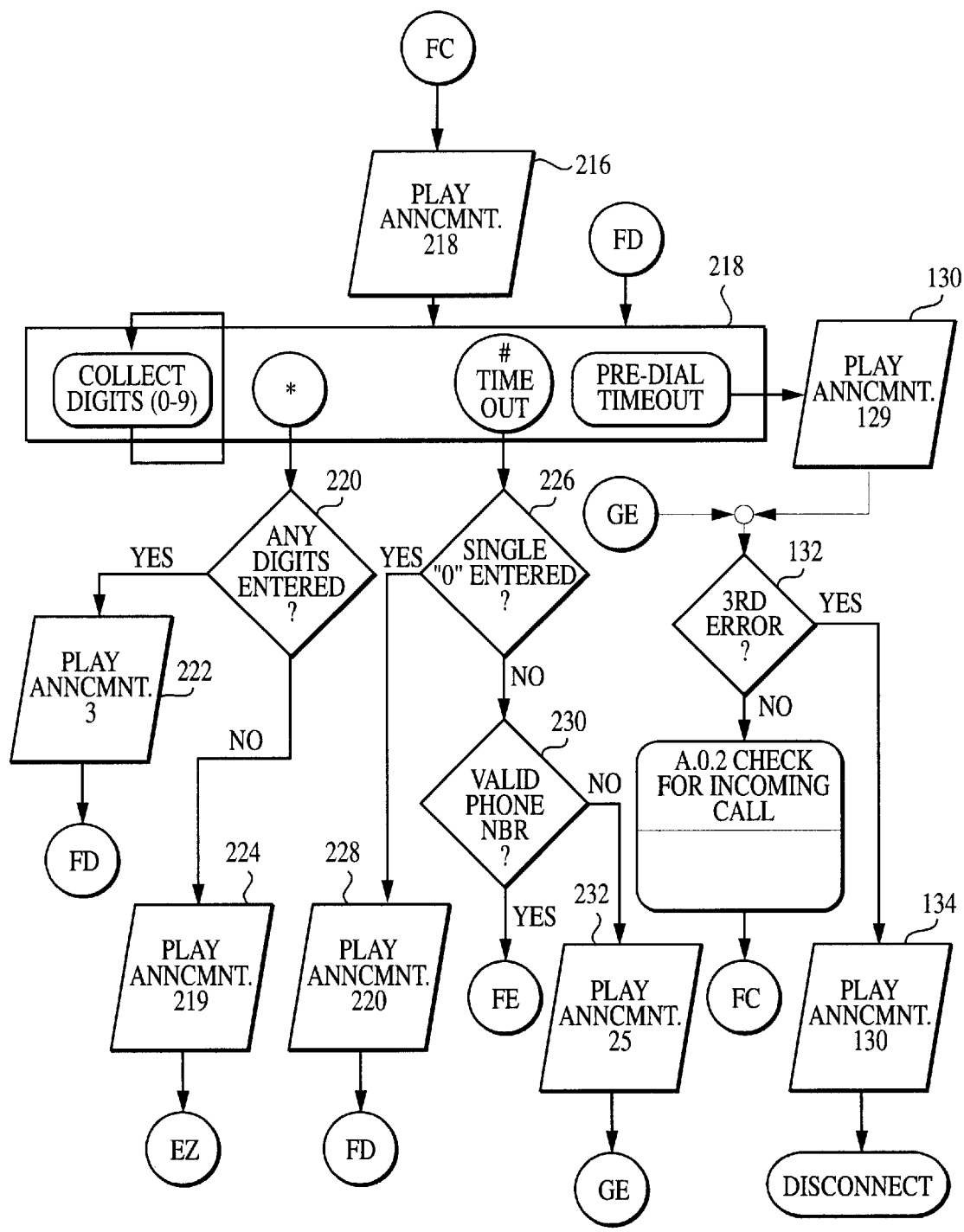
Figure 10:
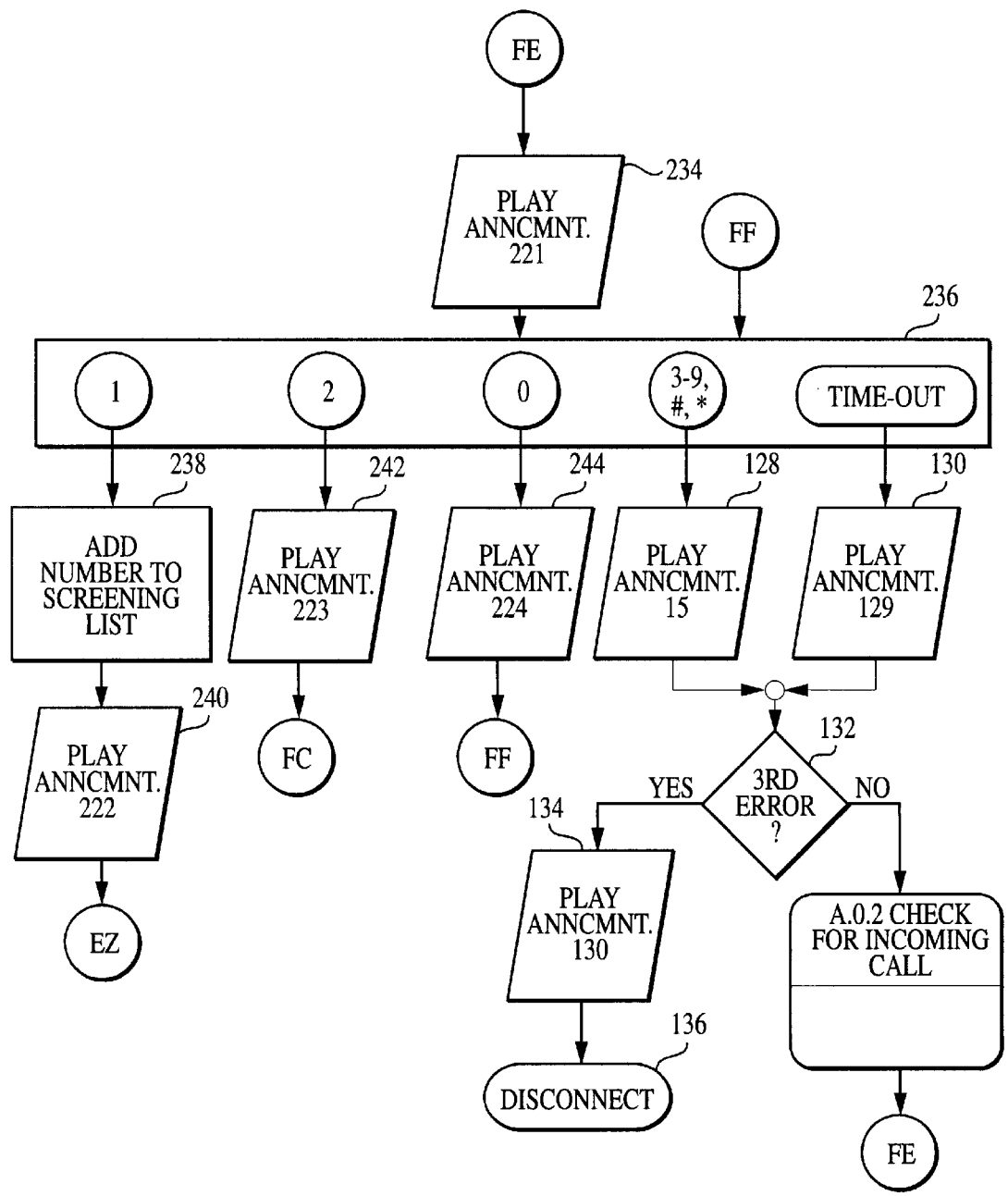

At step 236 it is determined what key the subscriber has depressed. If key 1 is depressed, then at step 238 the number is entered into the screening list and the following announcement is played at step 240: "That number has been added to your screening list," and control is returned to step 202 (FIG. 8). If key 2 is depressed, then at step 242 the following announcement is played: "No change has been made," and control is returned to step 216 (FIG. 9). If the zero key is depressed, then at step 244 the following announcement is played:

"Help information. You can make your selection while this message is playing. Pressing one will accept the number and add it to your screening list. Pressing two will allow you to enter a new telephone number. If you need additional help, please contact your account representative."

Control is returned to step 236 to determine what key is depressed. If any other key is depressed or the system times out before a selection is made, then the same steps 128,130, 132,134,136 described with reference to FIG. 4 are carried out.

Returning back to FIG. 8, if at step 208 key 3 is depressed, then at step 250 (FIG. 11) the following announcement is played:

"Please enter the telephone number you would like to delete from the screening list. If you make a mistake while entering the number, press star to start over. To cancel deleting a number, just press star. For help, press zero now."

At step 252 it is determined what keys have been depressed. If the star key is depressed, then at step 254 it is determined if any digits have been entered. If some have been, then at step 256 the following announcement is played: "Entry cleared," and control is returned to step 252 to determine what key is depressed. If no digits have been entered, then at step 258 the following announcement is played: "Deletion Canceled," and control is returned to step 202 (FIG. 8).

If the pound key is depressed or the system times, then at step 260 it is determined if the zero key has been depressed once. If it has, then at step 262 the following announcement is played:

"Help information. Enter the ten-digit number which you would like to delete from the screening list. It is not necessary to enter a one before the area code. If you make a mistake while entering the number, pressing star will clear what you have entered and let you start over. Pressing star without entering any digits will cancel the deletion of the number from the list. If you need additional help, please contact your account representative."

Control is then returned to step 252 to determine what keys are depressed. If the zero key has not been depressed, then it is determined at step 264 if the number is on the screening list. If it is not, then at step 266 the following announcement is played: "<Entered number> is not on the screening list" and control is passed to step 132 which has already been described with reference to FIG. 9. If is the number is on the screening list, then at step 270 (FIG. 12) the following announcement is played:

"<entered number> If this is the number to be deleted, press one. To reenter the number, press two. For help, press zero now."

Figure 11:
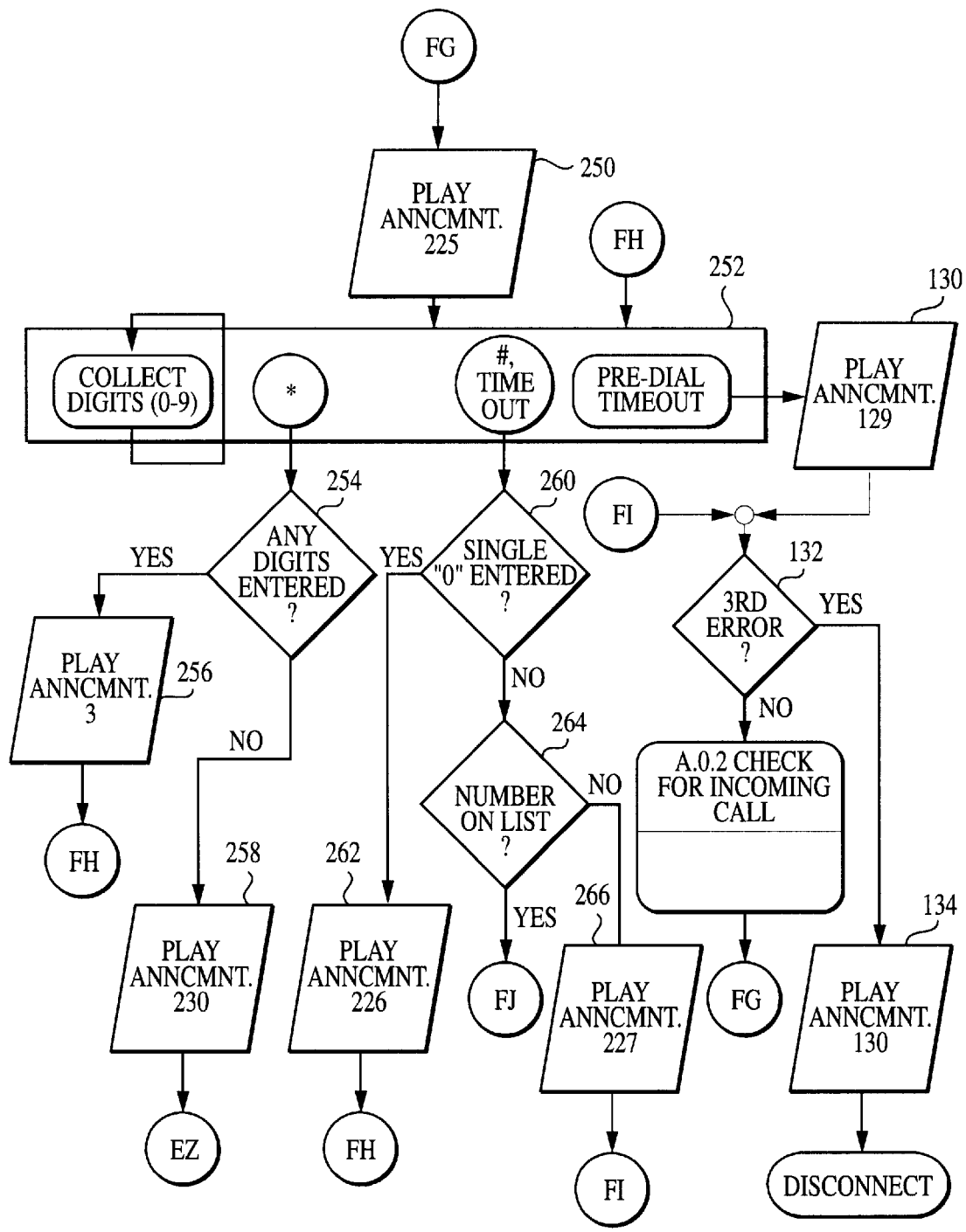
Figure 12:
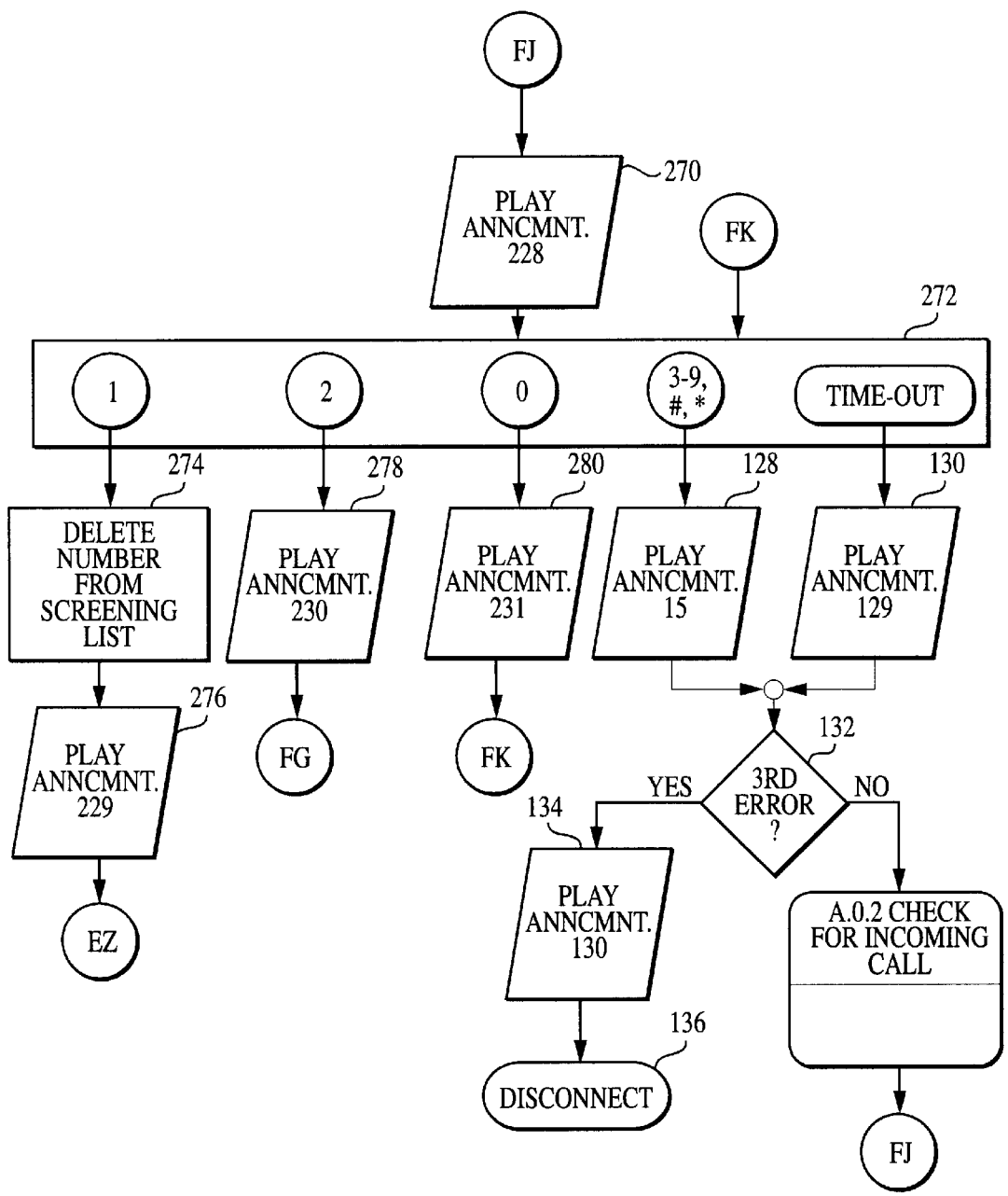

At step 272 it is determined what key is depressed. If key 1 is depressed, then at step 274 the number is deleted from the screening list and at step 276 the following announcement is played: "Number deleted," and control is returned to step 202 (FIG. 8). If key 2 is depressed, then at step 278 the following announcement is played: "Deletion canceled," and control is returned to step 250 (FIG. 11). If the zero key is depressed, then at step 280 the following message is played:

"Help information. You can make your selection while this message is playing. Pressing one will verify the number and delete it from your screening list. Pressing two will allow you to change the telephone number to be deleted. If you need additional help, please contact your account representative."

Control is returned to step 272. If any other key is depressed steps 128, 130, etc. as already described are carried out.

Figure 13:
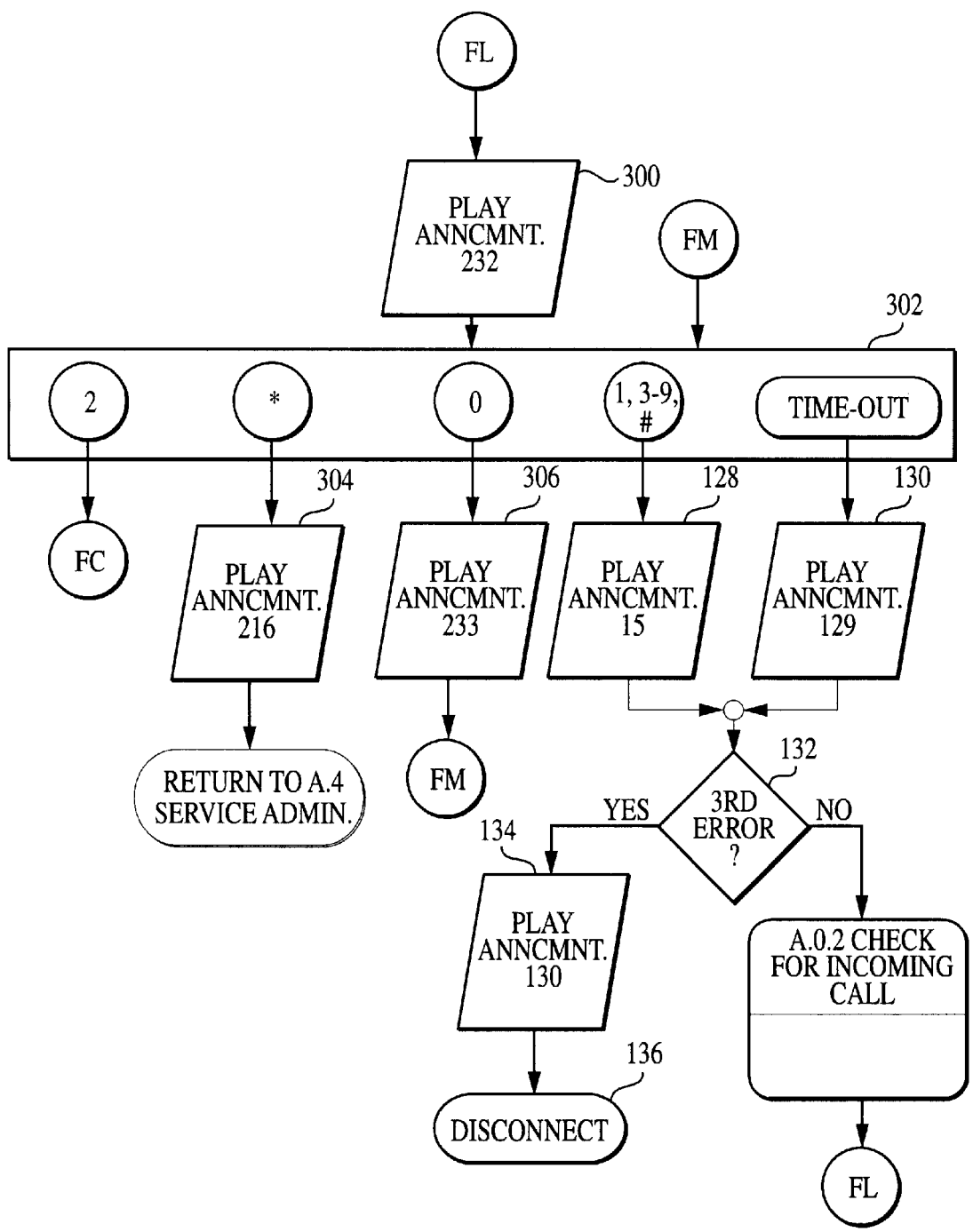
Figure 14:
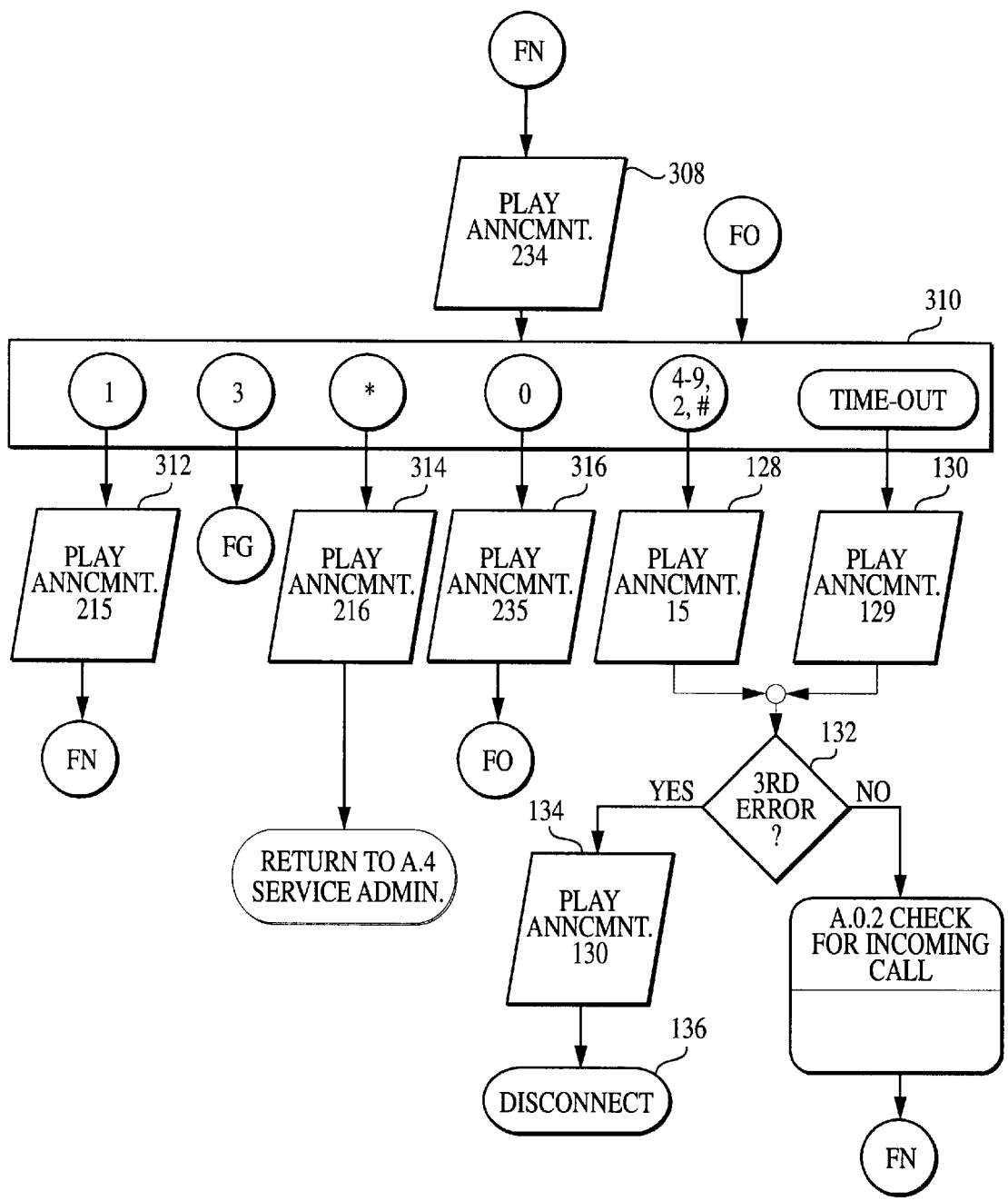
Figure 15:
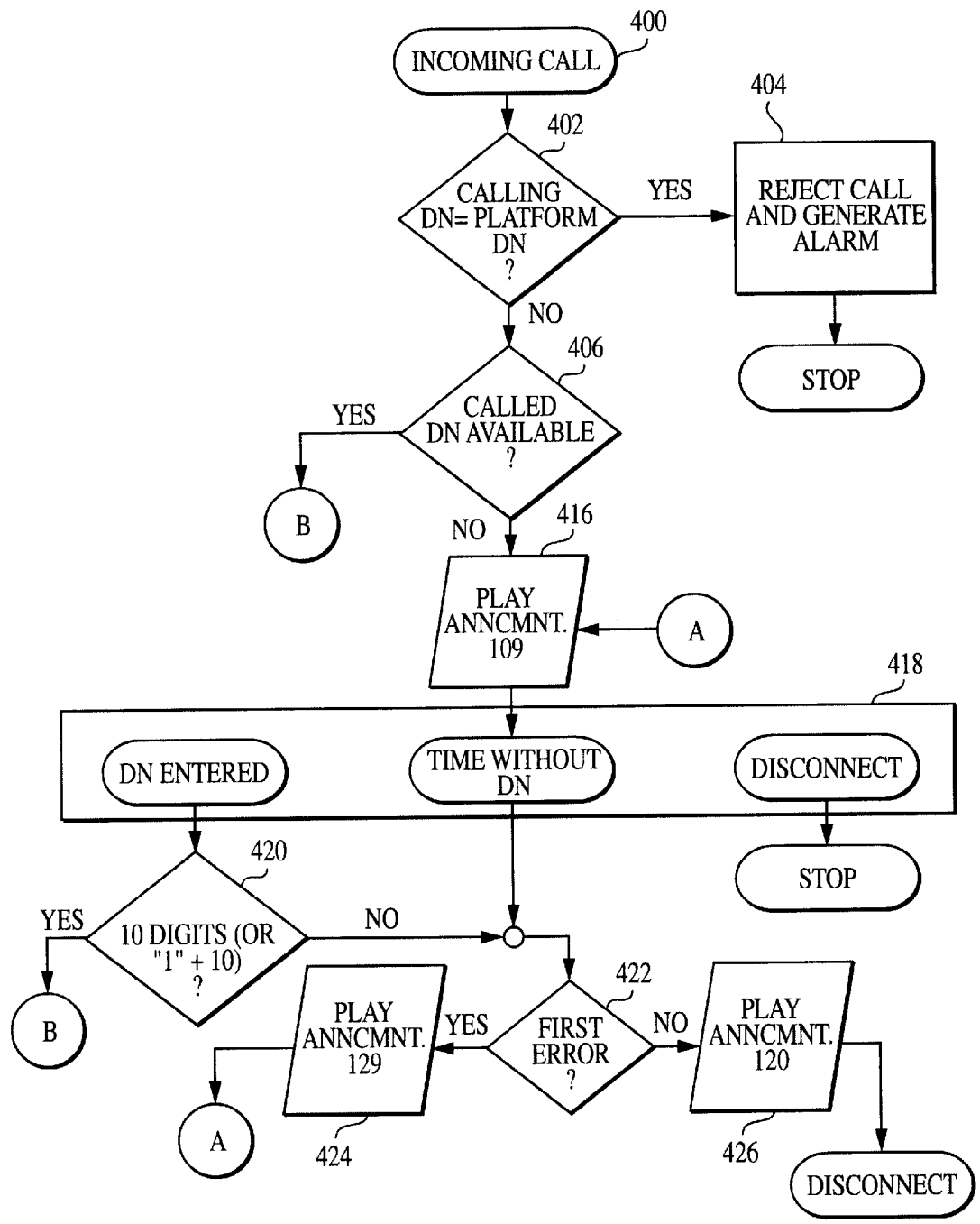
FIGS. 15–16 are flowcharts for a call routing flow program.

Returning to FIG. 8, if at step 202 it is determined that the screening list is empty, control is transferred to step 300 at FIG. 13 where the following announcement is played:

"Your screening list is empty. To add a number to the list, press two. For help, press zero now."

At step 302 it is determined what key the subscriber has depressed. If key 2 is depressed, control is transferred to step 216 (FIG. 9) where numbers can be added to the list. If the star key is depressed, then at step 304 the following announcement is played: "Screening list maintenance complete," and control is returned to the main menu.

If the zero key is depressed, then the following message is played: "Help information. You can make your selection while this message is playing. Your screening list is currently empty. Pressing two will allow you to enter a new number to the list. If you need additional help, please contact your account representative."

Control is then returned to step 302 to determine what keypad is depressed. If any other key is depressed, steps 128, 130, etc. as already described are carried out.

Referring back to FIG. 8, at step 204 if it is determined that the screening list is full, then at step 308 (FIG. 14) the following announcement is played:

"Your screening list is full. To listen to your screening list, press one. To delete a number from the list, press three. For help, press zero now."

At step 310 it is determined what key is depressed. If key 1 is depressed, then at step 312 the following announcement is played:

"The numbers on your screening list are <screening list>," and control is returned to step 308.

If key 3 is depressed, control is returned to step 250 (FIG. 11) so that a number can be deleted from the list. If the star key is depressed, then at step 314 the following announcement is played: "Screening list maintenance complete," and control is returned to the main menu. If the zero key is depressed, then at step 316 the following announcement is played:

"Help information. You can make your selection while this message is playing. Your screening list is full. Pressing one will read the numbers on your screening list to you. Pressing three will allow you to delete one of the numbers from the list. If you need additional help, please contact your account representative."

Control is then returned to step 310 to determine what key is depressed. If any other key is depressed, steps 128, 130, etc. as already described are carried out.

Returning to FIG. 3 if at step 104 the zero key is depressed, then control is transferred to step 103 where the following announcements are played:

"Help information. You can make your selection while this message is playing. Pressing one will allow you to change the setting of the recorded caller name option. When this feature is active, callers are asked to record their name and it is played back when you are located for the call. Pressing two will allow you to change the setting of the calling party number screening option. When active, the caller's telephone number, if available, is announced to you . . . . Pressing four will allow you to change the list of telephone numbers that will immediately go to your default destination. Pressing star will return you to the previous menu. If you need additional help, please contact your account representative."

Control is then returned to step 104 to determine what selection is made.

The programs illustrated in the flowcharts of FIGS. 3–14 create a profile in a database 35 (see FIG. 2) for each subscriber which defines the subscriber profile, i.e. what screening options have been selected by the subscriber. The database 35 is stored in the control computer 30 (FIG. 2). While only one database is shown there may be a plurality of databases if needed.

Returning to FIG. 3, if the star key is depressed at step 104, then the subscriber is transferred to the main menu.

II. Incoming Call Processing

From the calling party's perspective, when the calling party dials a subscriber's PAS number, the incoming call is coupled to the platform 18 where the subscriber's profile associated with the subscriber's PAS. number is retrieved from database. FIGS. 15–24 are flowcharts for an incoming call routing flow program. At reference point 400 an incoming call is detected. At step 402 it is determined if the calling directory number equals the platform directory number. If it does, at step 404 the call is rejected and an alarm is generated. This is to prevent the system from going into a continuous loop if someone has placed their personal access service (PAS) phone number in their profile thereby tying up platform resources. The program is then ended. If it is determined at step 402 that they are not equal, then at step 406 it is determined if the called directory number is available. If it is, then at step 408 (FIG. 16), the subscriber's profile is retrieved. At step 410 it is determined if the subscriber's profile retrieved in step 408 is a valid profile, i.e., meaning it has not been disabled, for example. If it is not, then the following announcement is played at step 412:

"You have reached a non-working number. Please check the number and dial again."

Then at step 414 the call is disconnected and an alarm is generated. The program is then ended. If it was determined at step 410 that the profile retrieved in step 408 is valid, the service routing subroutine program is then entered as will be discussed with reference to FIGS. 17–19.

Referring back to FIG. 15, if it is determined at step 406 that the called directory number is not available, then at step 416 the following announcement is played:

"Please enter the area code and telephone number of the person you are trying to reach."

Figure 16:
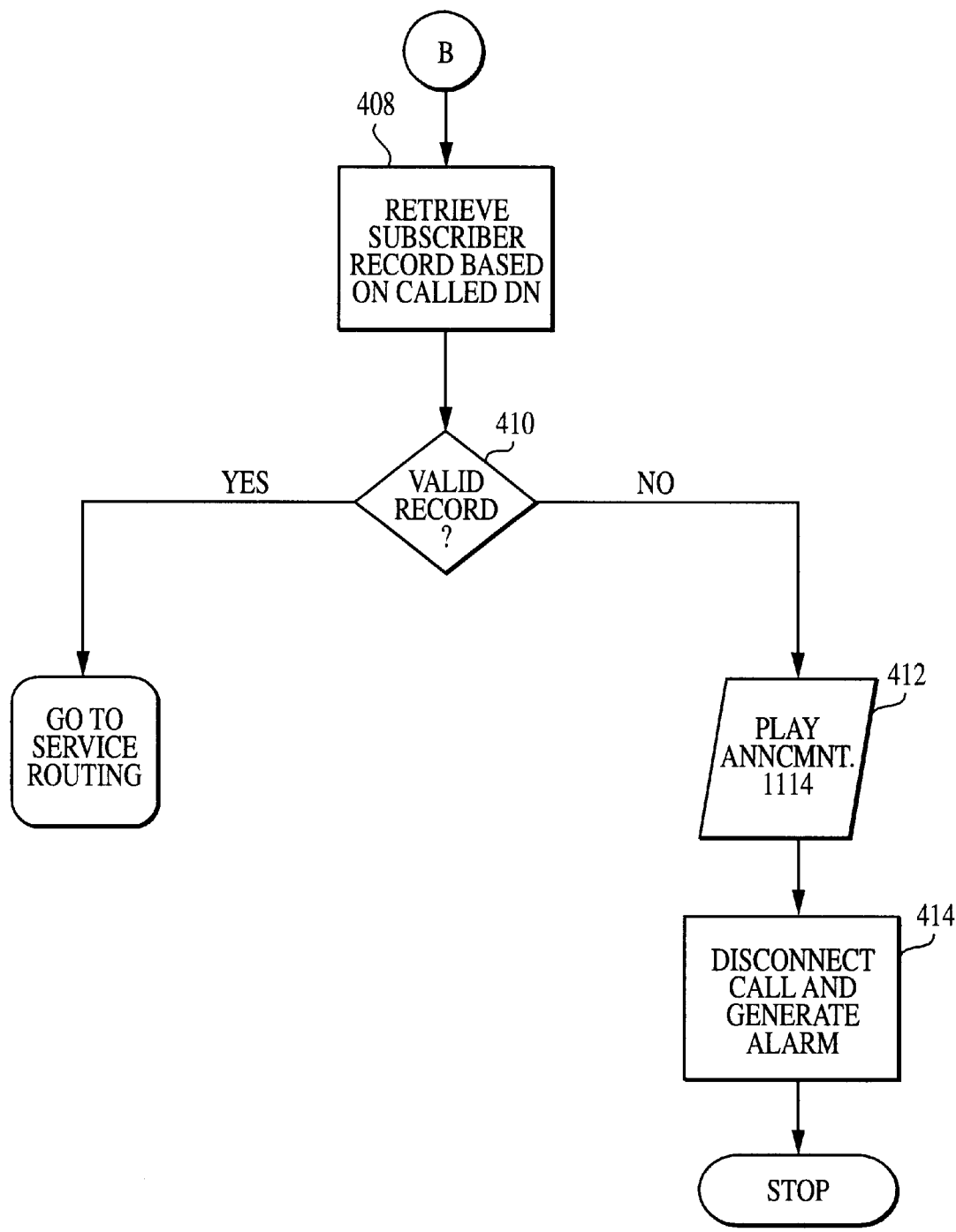

At step 418 it is determined what action has been taken by the caller. If the dialed number is entered, then at step 420 it is determined if the proper number of digits have been entered. If they have, control is returned to step 408 (FIG. 16). If not, then at step 422 it is determined if this is a first error. If it is, then at step 424 the following announcement is played:

"No keypresses have been received."

Control is then returned to step 416 to allow the caller another opportunity to correctly enter the subscriber's telephone number. If it was determined at step 422 that this was not the caller's first error, then at step 426 the following message is played:

"That was not a valid entry. Please try again later. Goodbye," and the caller is disconnected.

If at step 418 it is determined that the caller has not made a selection before the system has timed out, then the same step 422 already described is carried out. If at step 418 it is determined that the caller has become disconnected, then the program is terminated.

Figure 17:
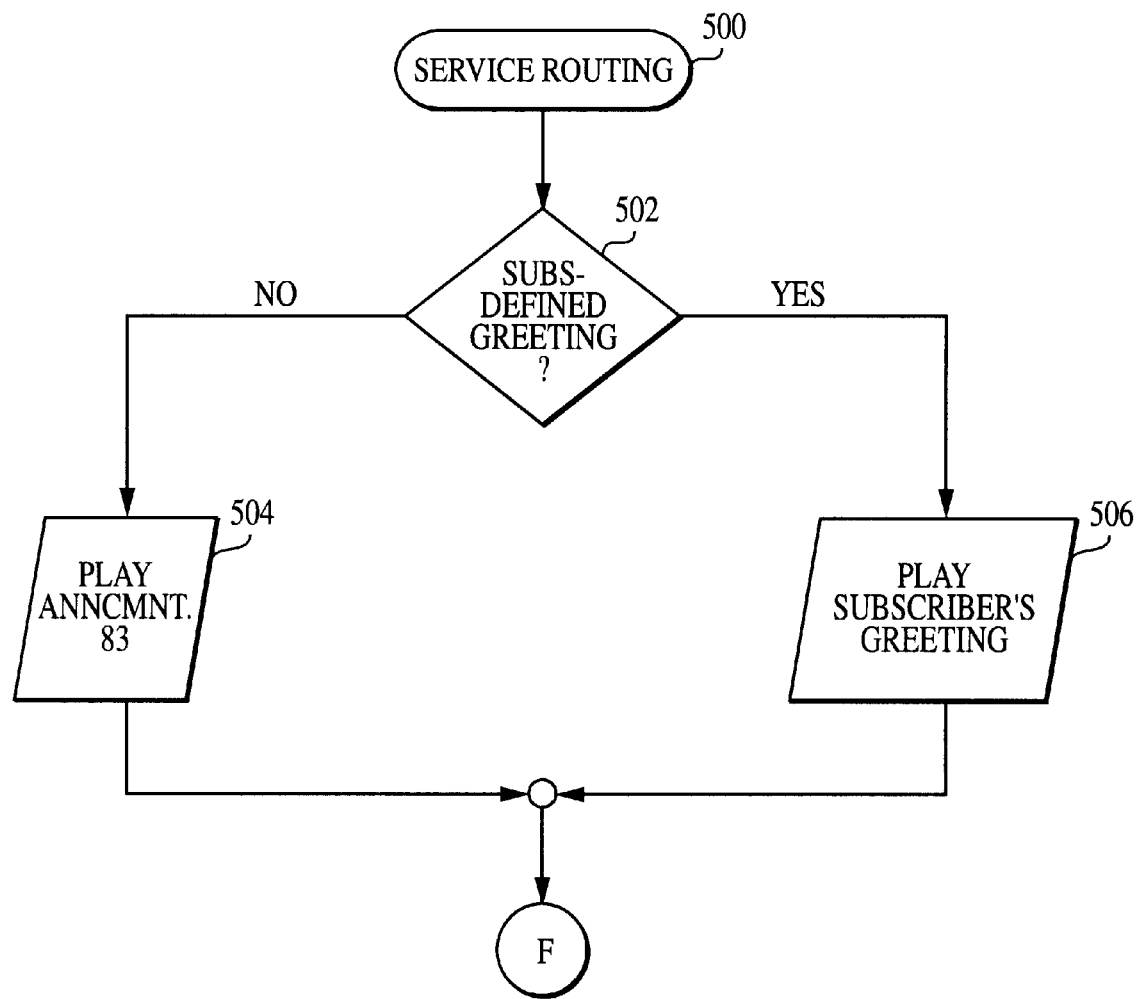
FIGS. 17–20 are flowcharts for the service routing subroutine program.
Figure 18:
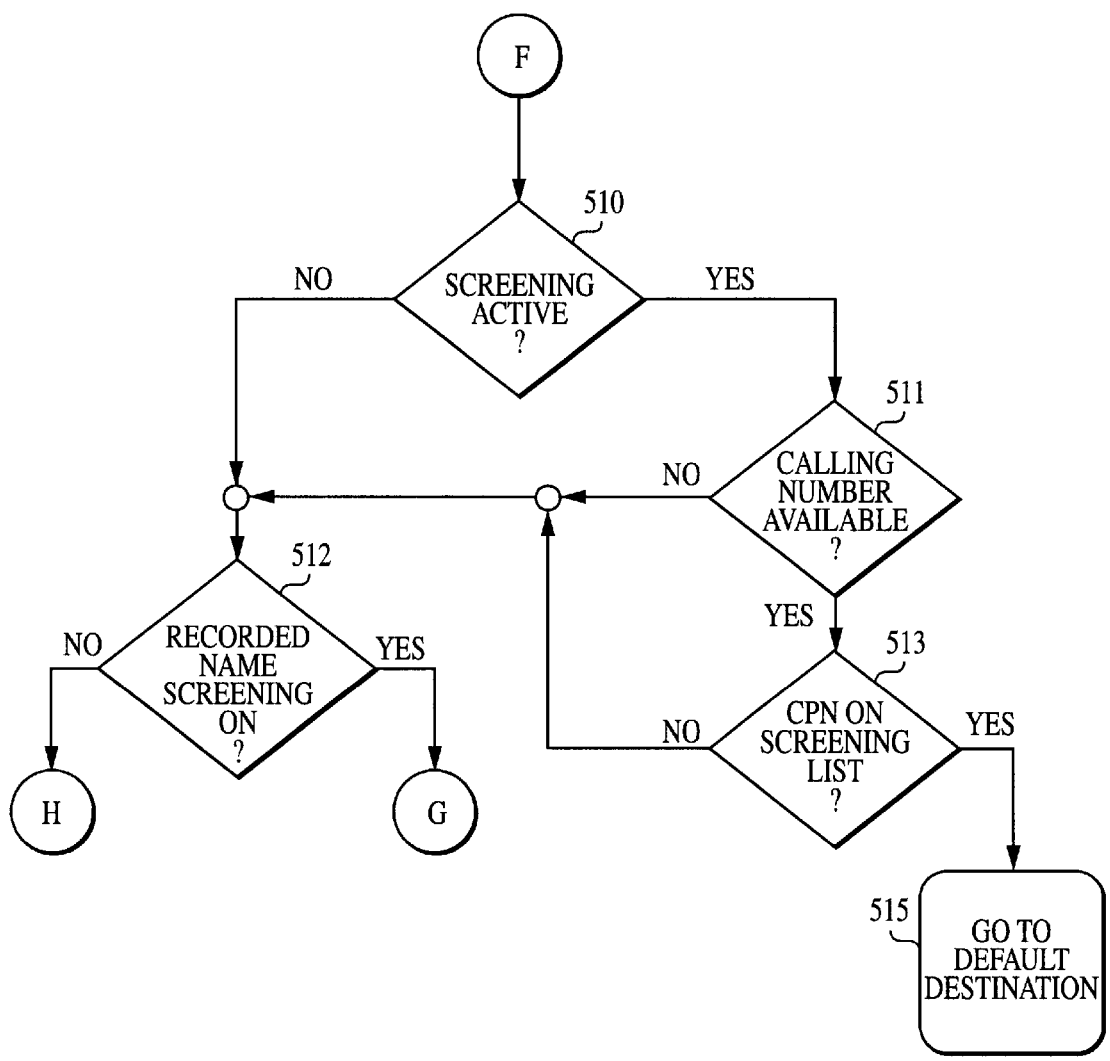
Figure 19:
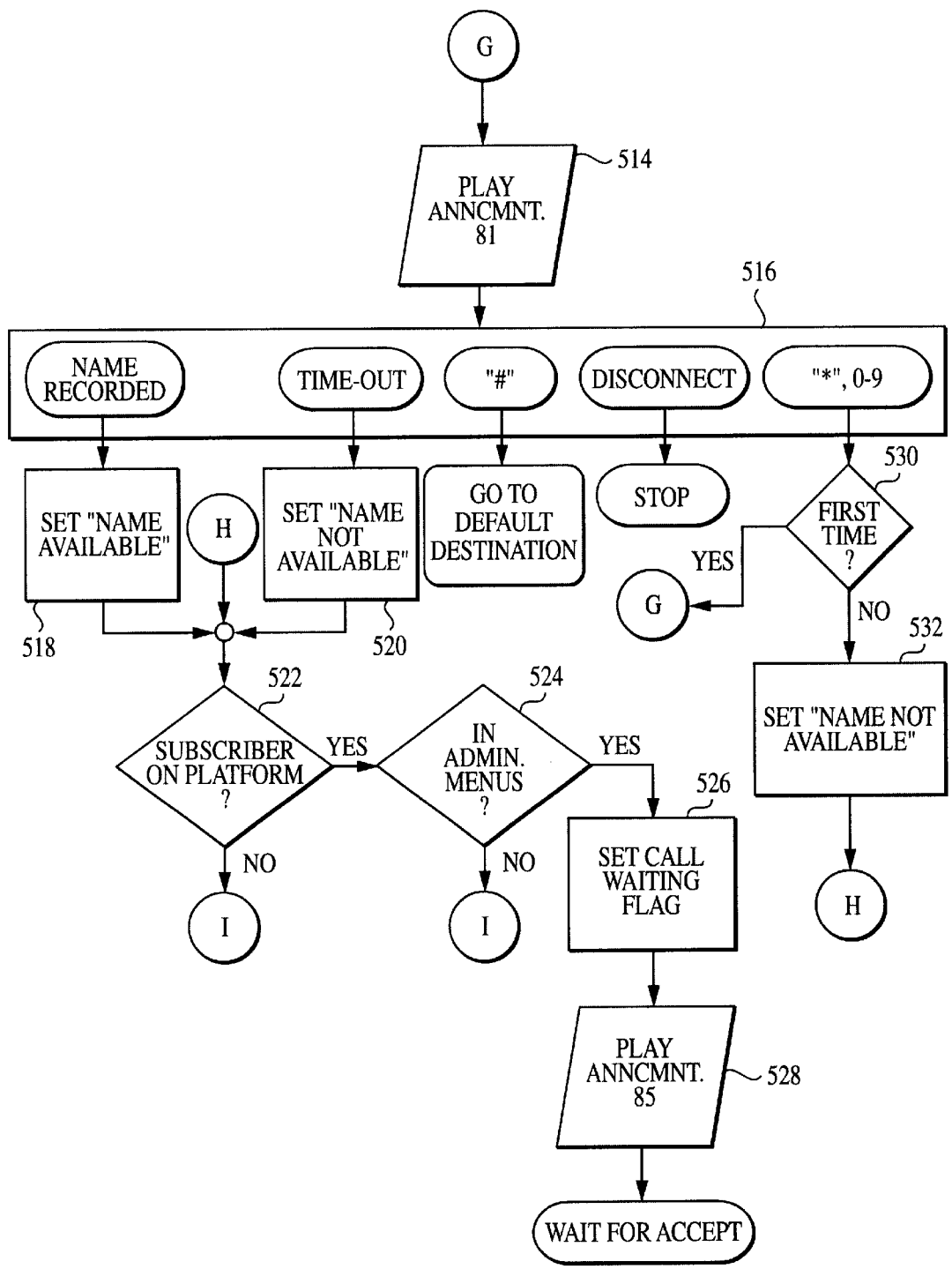
Figure 20:
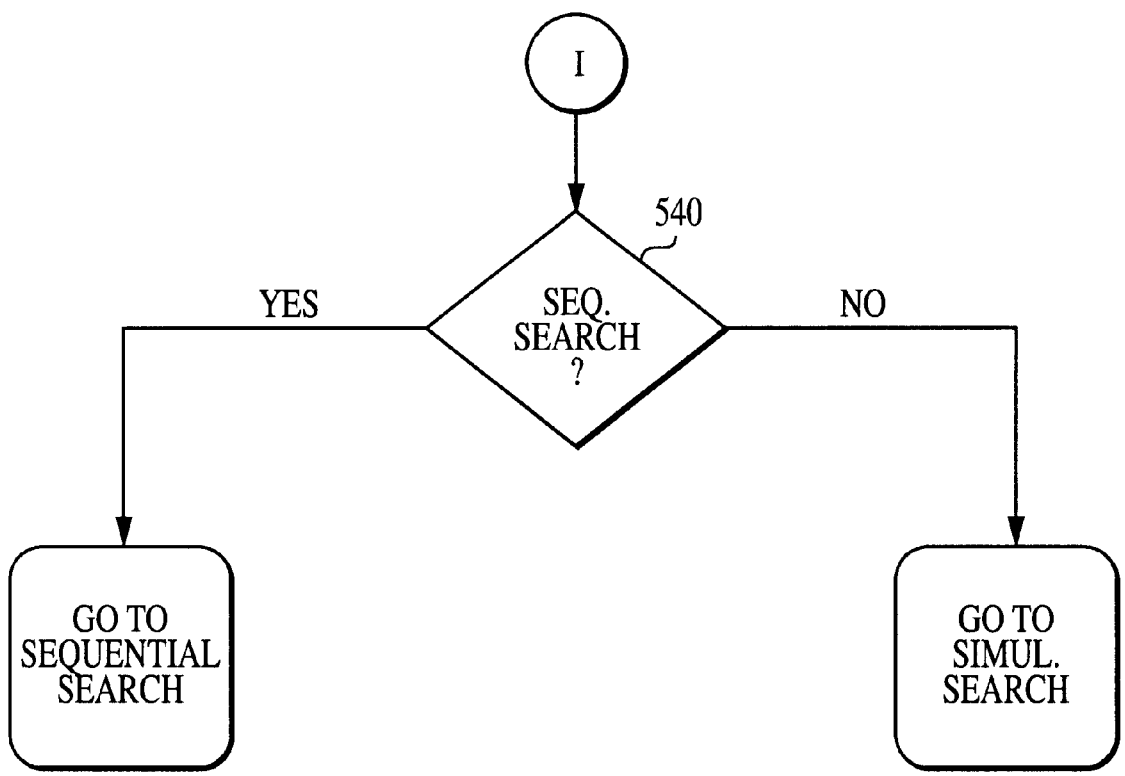
Figure 21:
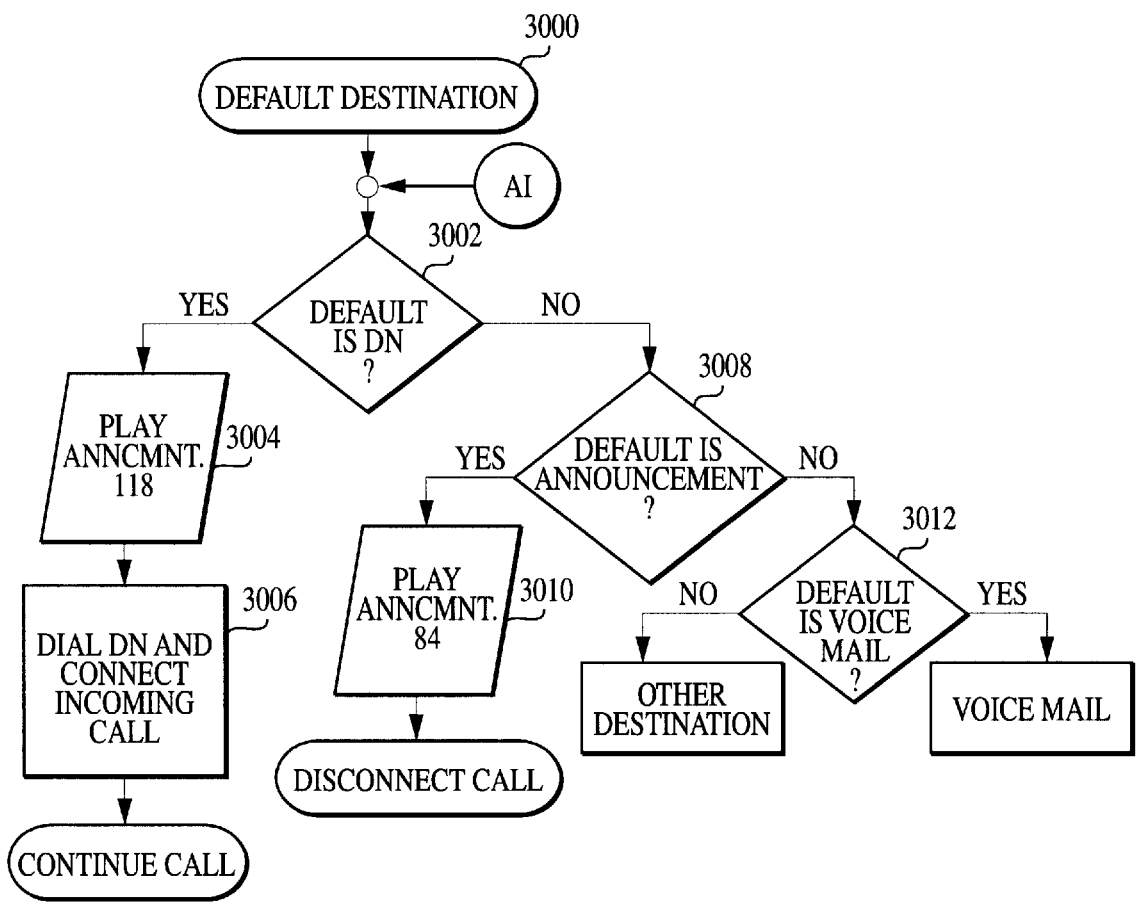
FIG. 21 is a flow chart for the default destination subroutine program.

FIGS. 17–19 are flowcharts for the service routing subroutine program that is entered only if it is determined at step 410 (FIG. 16) that the retrieved subscriber profile is a valid one. The subroutine begins at reference 500. At step 502 it is determined if the subscriber has recorded a greeting. If not, then at step 504 the following announcement is played:

"You have called the number for <subscriber's name>."

If the subscriber has recorded a greeting, then at step 506 the subscriber's greeting is played back to the caller. At step 510 (FIG. 18) it is determined whether screening list feature is active. If it is not, then at step 512 it is determined if the recorded name screening feature is activated. If it is not, then control is transferred to step 522 (FIG. 19) which will be described in detail hereinafter. If the recorded name screening feature is activated, then at step 514 (FIG. 19) the following announcement is played:

"Who may I say is calling?"

At step 516 it is determined what action the caller has taken. If the caller has recorded his or her name, then at step 518 a flag is set indicating a name has been recorded. If the caller does not take any action before the system times out, then at step 520, a flag is set that the recorded name is not available. In either case, at step 522 it is determined if the subscriber is on the platform. If the subscriber is on the platform in system administration, then at step 256 the call waiting flag is set and at step 528 the following announcement is played: "Please hold while your party is contacted. If you would like to be connected to <default destination>, press pound at any time."

If it is determined at step 522 that the subscriber is not on the platform or at step 524 that the subscriber is on the platform but not in the administration menu, the incoming call will be directed to a telephone number indicated by the subscriber in the subscriber's profile.

If it is determined at step 516 that the caller has pressed the pound key, then the incoming call is sent to a default destination such as the subscriber's voice mailbox, for example, where the calling party can leave a message for the subscriber. If the caller hangs up, the program ends. If the caller depresses the star key or keys 0–9, then at step 530 it is determined if it is the first time. If it is, then control is returned to step 514. If it was not the first time, then at step 532 a flag is set that the calling party has not recorded his or her name and control is returned to step 522.

If it was determined at step 510 that the screening list is active, then at step 511 it is determined if the calling party number is available. If it is, then at step 513 it is determined if the calling party's number is on the screening list. If it is, then the incoming call is sent to a default destination at step 515 which will be described in detail hereinafter. If it was determined at step 511 that the calling party number is not available or at step 513 that the calling party's number is not on the screening list, control is passed to step 512 as already described. The default destination subroutine is shown in the flow chart of FIG. 21. The subroutine begins at 3000. At step 3002 it is determined if the default location is a telephone number. If it is, then at step 3004 the following announcement is played: "Your call is being forwarded now. Please hold." Then at step 3006 the default telephone number is dialed and connected to the calling party. If it is determined at step 3002 that the default is not a telephone number, then at step 3008 it is determined if the default location is an announcement. If it is, then at step 3010 the following announcement is played: "Your party is not available now. Please try again later. (1 second pause) Good-bye." And the calling party is disconnected. If the default destination is not an announcement, then at step 3012 it is determined if the default destination is voice mail. If it is, the following announcement is played: "Your call is being forwarded to your party's voice mail. Please continue to hold" and the incoming call is transferred to voice mail. Otherwise the incoming call can be forwarded to some other destination such as a pager, for example.

Figure 22:
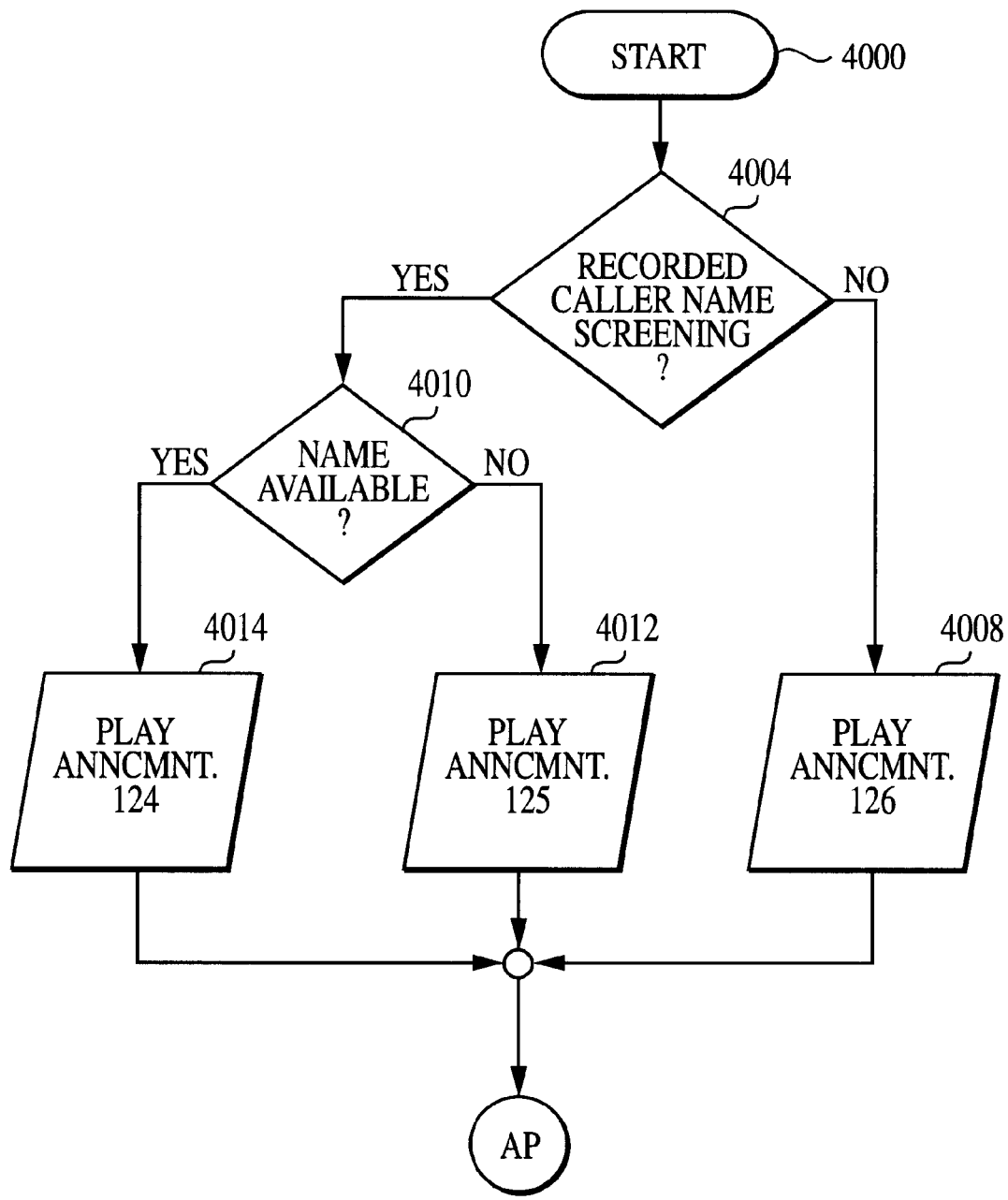
FIGS. 22–24 are flowcharts of an incoming call notification subroutine.
Figure 23:
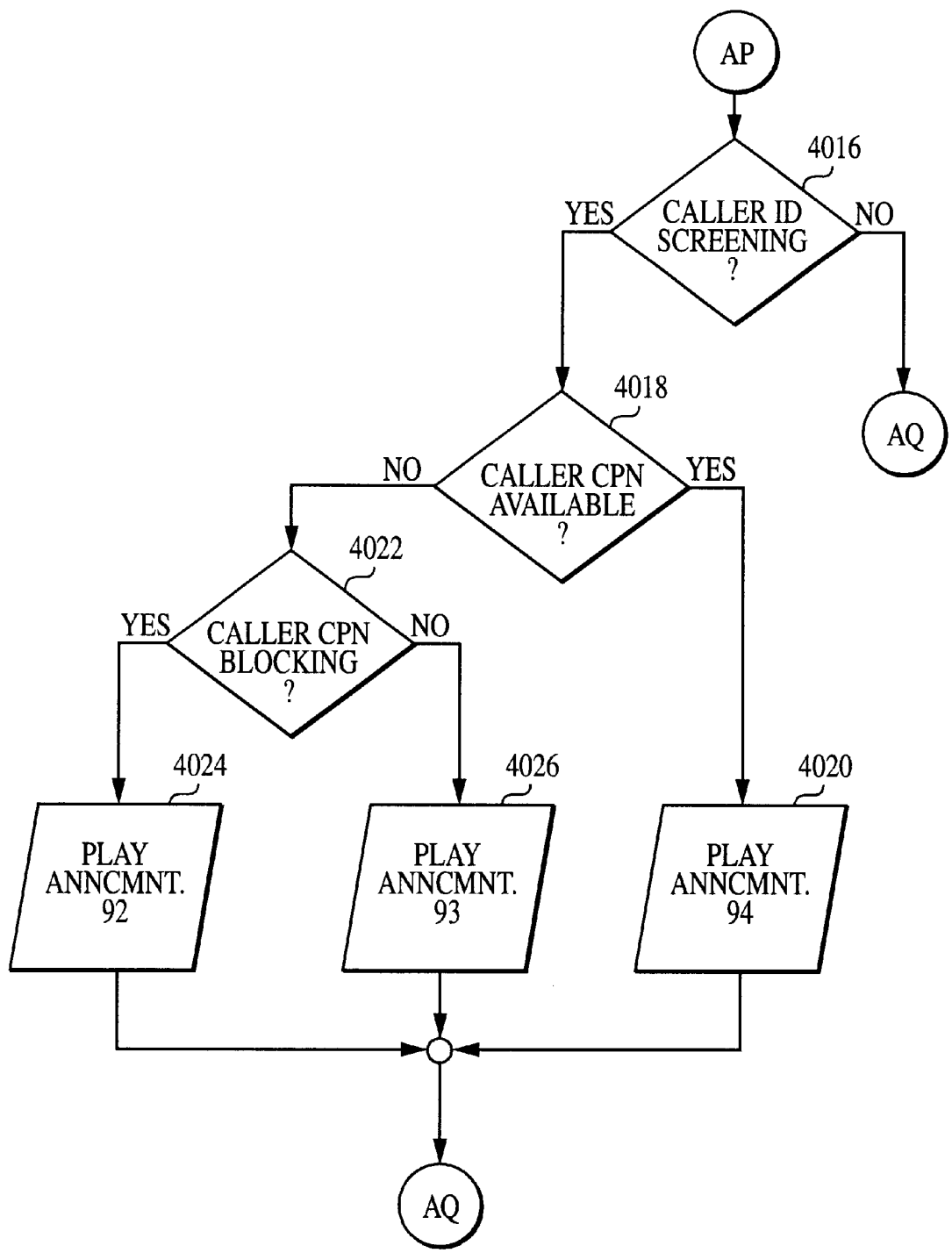
Figure 24:
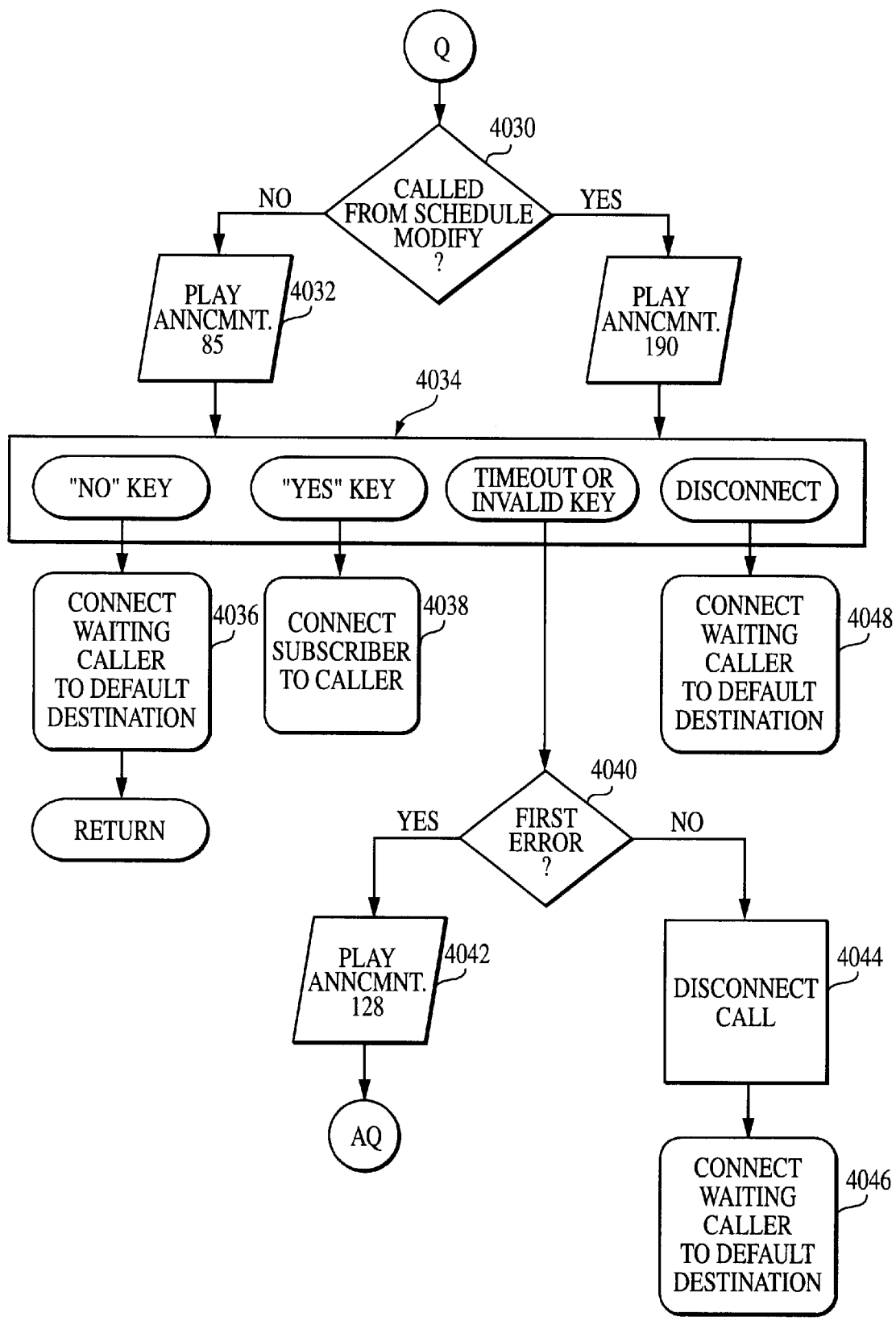

FIGS. 22–24 are flowcharts of an incoming call notification subroutine. The program starts at step 4000. At step 4004 it is determined whether recorded caller name screening is active. If not, then at step 4008 the following message is played: "You have a caller waiting." If it is determined at step 4004 that recorded caller name screening is active, then at step 4010 it is determined whether the recorded caller name is available. If it is, then at step 4014 the following announcement is played: "You have a call from <caller's name>." If it is not available, then at step 4012 the following announcement is played: "You have a call from an unknown caller." After the announcement is played at step 4008, 4012, or 4014, control is transferred to step 4016 (FIG. 23). If caller I.D. screening is active, control is transferred to step 4018 where it is determined whether the caller's number is available. If it is, then at step 4020 the following announcement is played "from <CPN>." If the caller's number is not available, then at step 4022 it is determined whether the caller's number is blocked. If it is blocked, then at step 4024 the following announcement is played: "from a blocked number." If the number is not blocked, then at step 4026 the following announcement is played: "from an unknown number."

After step 4020, 4024, 4026, or 4016, control is transferred to step 4030 (FIG. 24) where it is determined whether the subscriber is in the process of modifying his or her profile. If not, then at step 4032 the following announcement is played: "To accept the call, press <yes key>. To transfer the caller to your default destination, press <no key>." At step 4034 it is determined what key is depressed. If the "no" key is depressed, at step 4036 the caller is transferred to a default destination. If the "yes" key is depressed, then at step 4038 the caller is connected to the subscriber. If no selection is made or an invalid key is depressed, then at step 4040 it is determined whether it was a first error. If it was, then at step 4042 the following announcement is played: "That was not a valid selection. Please try again," and control is returned to step 4030. If it was not a first error, control is transferred to step 4044 where the subscriber is disconnected and at step 4046 the caller is transferred to a default destination. If at step 4034 the subscriber hangs up, the caller is transferred at step 4048 to the default destination.

It is to be understood that the forms of the invention described herewith are to be taken as preferred examples and that various changes in the shape, size and arrangement of parts may be resorted to, without departing from the spirit of the invention or scope of the claims.

What is claimed is:

1. A call processing method in a telecommunications system, the method comprising:
   receiving a call at a first end office switch of the telecommunications system, the call placed by a calling party for a called party at a called communication station;
   routing the call from the first end office switch to a platform, the platform associated with a platform end office switch;
   retrieving a subscriber profile for the called party;
   playing to the calling party one of a called party-provided greeting and a greeting announcement;
   determining if a screening list feature is active;
     if so, determining if a number associated with the calling party is available;
     if so, determining if the number associated with the calling party is on a screening list of the called party;
     if so, routing the call to a default destination at the platform;
     if the number associated with the calling party is not available or if the number associated with the calling party is not on the screening list,
   determining if a recorded name screening feature is active;
     if so, prompting the calling party for identification;
     recording the spoken identification provided by the calling party;
     determining status of the called party;
       if the called party is engaged in a call, providing an announcement and entering a call waiting process;
       otherwise, routing the call to a directory number in accordance with the subscriber profile;
   connecting from the platform and the platform end office switch to an end office switch which is associated with the called communication station and which is different from the platform end office switch, and playing to the called communication station one of a predefined announcement and the recorded spoken identification;
   determining from the subscriber profile if caller ID screening is active for the called party;
     if so, determining if a calling directory number is available;
       if so, connecting to the end office switch which is associated with the called communication station and announcing the calling party directory number to the called communication station from the platform;
       otherwise, if the calling directory number is not unknown, connecting to the end office switch which is associated with the called communication station and announcing an unavailable directory number to the called communication station from the platform;
   prompting the called party to accept or reject the call;
   detecting at the platform a call routing option entered at the called communication station and detected at the end office switch which is associated with the called communication station;
     if the call routing option corresponds to rejecting the call, routing the call to a default destination at the platform; and
     if the call routing option corresponds to accepting the call, connecting the call between the first end office switch and the end office switch associated with the called communication station to connect the calling party with the called party.

2. The method of claim 1, further comprising:
   determining if the subscriber profile is valid.

3. The method of claim 1, further comprising:
   detecting a called directory number associated with the call;
   determining if the called directory number is available; and
   if the called directory number is not available, prompting the calling party to enter a desired directory number.

4. The method of claim 1 further comprising:
   when the call is routed to the default destination,
   determining if the default destination corresponds to a telephone number;
     if so, playing an announcement to the calling party and directing the call to the telephone number;
   otherwise, determining if the default destination corresponds to an announcement;
     if so, playing the announcement and disconnecting the call;
   otherwise, determining if the default destination corresponds to voice mail; and
     if so, providing a voice mail announcement and routing the call to voice mail.

5. The method of claim 1 wherein playing to the called communication station one of a predefined announcement and the recorded spoken identification comprises:
   determining if the recorded name screening feature is activated;
     if not, connecting to the end office switch associated with the called communication station and providing the predefined announcement to the called communication station from the platform;
     if the recorded name screening feature is activated, determining if the recorded spoken identification is available,
       if so, connecting to the end office switch which is associated with the called communication station and providing an announcement including the recorded spoken identification to the called communication station from the platform, and
       otherwise, connecting to the end office switch which is associated with the called communication station and providing an unknown caller announcement to the called communication station from the platform.

6. The method of claim 1 further comprising:
   if caller ID screening is active for the called party; and if the calling directory number is unavailable, determining if the calling directory number is blocked;
     if so, connecting to the end office switch which is associated with the called communication station and announcing a blocked directory number to the called communication station from the platform; and otherwise, connecting to the end office switch which is associated with the called communication station and announcing an unknown directory number to the called communication station from the platform.

* * * * *